COLOR TELEVISION RECEIVER WITH LARGE PROJECTION SCREEN

Filed Oct. 14, 1959 7 Sheets-Sheet 1

INVENTOR
GEORGES VALENSI
BY Kurt Kelman
HIS AGENT

INVENTOR
GEORGES VALENSI
By [signature]
His AGENT

INVENTOR
GEORGES VALENSI
BY [signature]
HIS AGENT

COLOR TELEVISION RECEIVER WITH LARGE PROJECTION SCREEN

Filed Oct. 14, 1959 7 Sheets-Sheet 4

INVENTOR
GEORGES VALENSI
BY [signature]
HIS AGENT

Nov. 8, 1960 G. VALENSI 2,959,635

COLOR TELEVISION RECEIVER WITH LARGE PROJECTION SCREEN

Filed Oct. 14, 1959 7 Sheets-Sheet 5

INVENTOR
GEORGES VALENSI
By [signature]
HIS AGENT

INVENTOR
GEORGES VALENSI
BY [signature]
HIS AGENT

COLOR TELEVISION RECEIVER WITH LARGE PROJECTION SCREEN

INVENTOR
GEORGES VALENSI
BY [signature]
HIS AGENT

United States Patent Office 2,959,635
Patented Nov. 8, 1960

2,959,635

COLOR TELEVISION RECEIVER WITH LARGE PROJECTION SCREEN

Georges Valensi, 3 Rue des Chaudronniers, Geneva, Switzerland

Filed Oct. 14, 1959, Ser. No. 846,411

Claims priority, application France July 16, 1959

14 Claims. (Cl. 178—5.4)

Figure 1B:
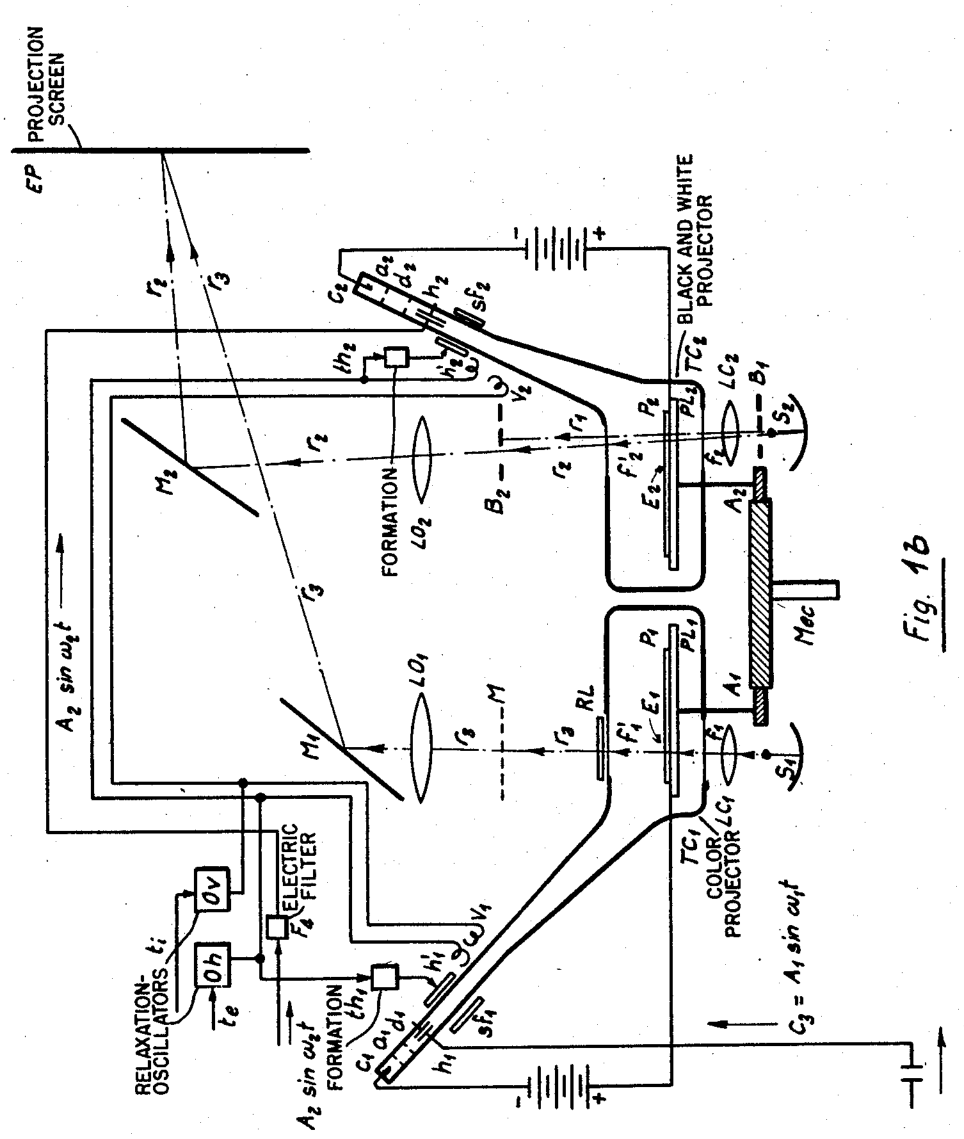
Figure 1A:
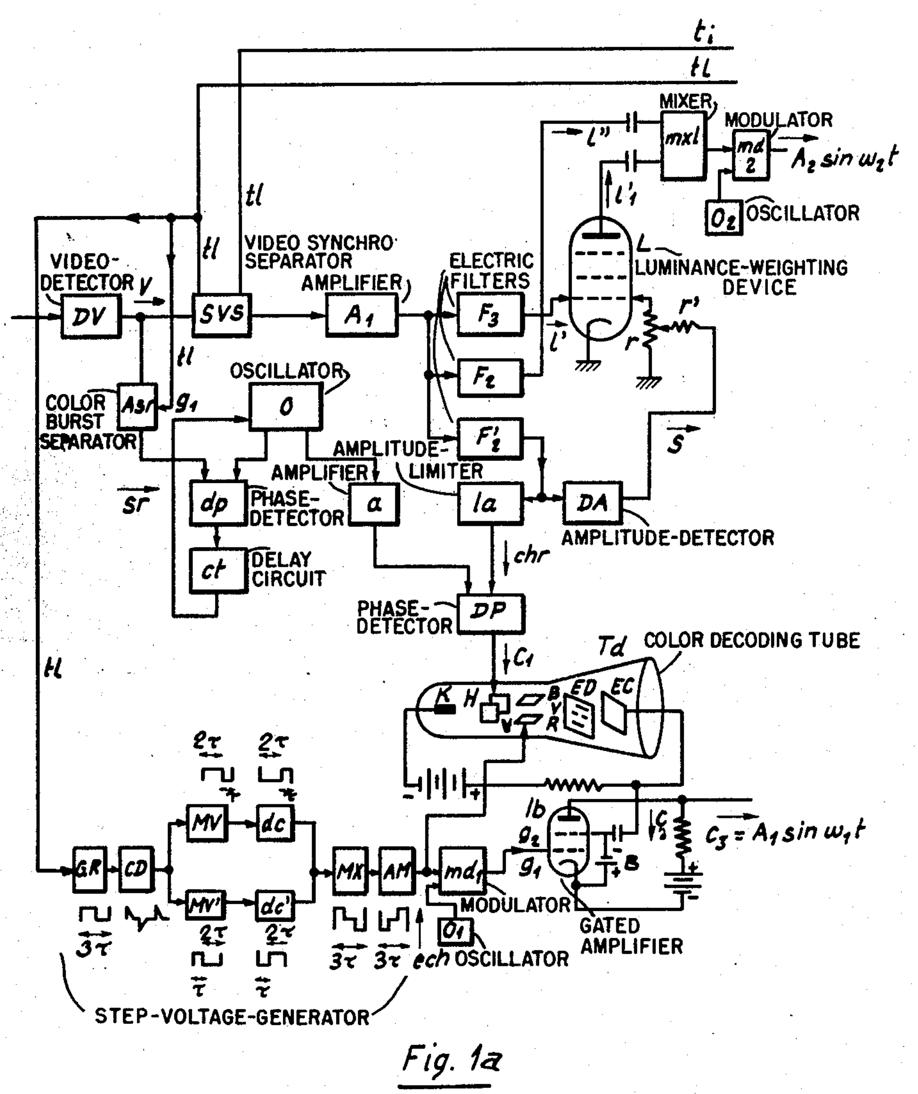

This invention concerns a television system in which a carrier wave (modulated by a luminance signal *l*) carries the information for a detailed drawing of the scene to be shown at distance, whereas a subcarrier wave (modulated by a chrominance signal *chr*) carries the information for the colors of the various elements of said scene. It is well known that the human eye requires less color information than drawing information; therefore the chrominance spectrum occupies only a relatively small part of the frequency band occupied by the luminance spectrum; for example, the luminance occupies a band 4 megahertz wide, whereas the two side-bands of the color subcarrier (together with the subcarrier itself) occupy only a band 1 megahertz wide.

A satisfactory reproduction in colors of the scene scanned at a distant transmitting station can be produced by superimposing, upon a very detailed black and white drawing (on a projection screen), a relatively coarse colored picture, made of a relatively small number of "touches" having different colors. In order to secure the persistence of the impressions on the retina, the drawing with 625 scanning lines (in the European television standards) must be repeated 25 times per second; similarly, in the American television standards, the drawing, with 525 scanning lines, must be repeated 30 times per second; in both cases, the aspect ratio of the picture is 4/3. Assuming a band width of 400,000 hertz for one side-band of the modulated color subcarrier received at the receiving television station, the coarse colored picture mentioned above would contain only: in Europe $$\frac{400,000}{25}=16,000$$

distinct colored elements, and in United States of America:

$$\frac{400,000}{30}=13,333$$

distinct colored elements. In Europe the coarse colored picture will have 110 lines of 146 distinct elements each; in U.S.A., it will have 100 lines of 133 distinct elements each.

Figure 2D:
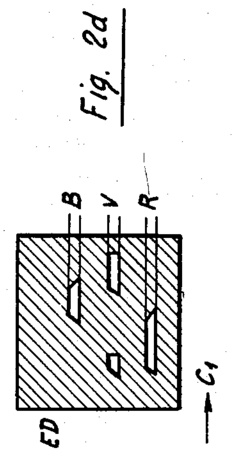

In the American color television standard (National Television Standards Committee System, in brief "N.T.S.C. System"), the color subcarrier is both phase modulated and amplitude modulated; the phase gives the "hue," and the amplitude gives the "degree of saturation" of the color to be reproduced. Figure 2*a* shows in solid lines the luminance spectrum *l*, and in dotted lines the chrominance spectrum (*chr*); Figure 2*b* shows the circular diagram giving the phases for the various hues, with reference to the "color burst" *sr* (reference signal for color); the circle of Figure 2*b* is graduated in wave-lengths $\lambda_d$ expressed in millimicrons for the spectral colors, and in "complementary" wave-lengths $\lambda_c$ for the purples. The description hereafter deals, in way of example only, with the application of the invention to the American N.T.S.C. system.

Figure 1 is a schematic representation of the color television receiving station in accordance with the invention; EP is the projection screen; in this case the received video-signal is assumed to have the spectrum shown on Figure 2*a*.

Two projectors ($TC_1$, $TC_2$) of the Eidophor type are used simultaneously, each having a transparent plate ($PL_1$, $PL_2$) rotating continuously around a vertical axis ($A_1$, $A_2$), the upper faces of said plates being made electro-conductive by means of a very thin suitable transparent coating; the motions of said plates ($PL_1$, $PL_2$) are perfectly synchronous, because the same electric motor (not shown on Figure 1) drives said plates by means of the same mechanism (M*ec*). A thin layer ($P_1$, $P_2$) of a viscous oil having an appropriate electric conductivity is spread over the upper surface of each plate ($PL_1$, $PL_2$). Transparent windows ($f_1$, $f_2$) permit the illumination (through trnasparent plates $PL_1$, $PL_2$) of said oil layers by means of powerful sources of white light ($S_1$, $S_2$) located at the focus of concave mirrors and also at the focus of collimating lenses ($LC_1$, $LC_2$), so that parallel luminous rays illuminate (at normal incidence) two homothetic rectangles ($E_1$, $E_2$) of said oil layers ($P_1$, $P_2$); these rectangles ($E_1$, $E_2$) are scanned respectively by the pencils of the electrons produced by cathodes $c_1$, $c_2$—accelerated by anodes $a_2$, $a_2$—united into a cross-over inside aperture diaphragms $d_1$, $d_2$—concentrated on the oil layer by focussing magnetic coils $sf_1$, $sf_2$—horizontally deflected by coils $h'_1$, $h'_2$ and by plates $h_1$, $h_2$—and vertically deflected by coils $v_1$, $v_2$.

The electroconductive faces of plates ($PL_1$, $PL_2$) in contact with oil are raised to a high positive electric potential referred to cathodes ($c_1$, $c_2$); the bombarding electrons produce (on rectangles $E_1$, $E_2$) some "deformations" of the oil surface, due to the electrostatic forces developed by the electron spots; but these deformations disappear after a fraction of a second, because the oil is slightly electroconductive.

Rectangle $E_2$ (of oil layer $P_2$, in tube $TC_2$) is imaged, through transparent window $f'_2$, by objective lens $LO_2$ onto projection screen EP, in order to produce a detailed black and white drawing of the scene being scanned at the transmitting station; rectangle $E_1$ (of oil layer $P_1$, in tube $TC_1$) is imaged, through transparent window ($f'_1$), by objective lens $LO_1$, onto projection screen EP, in order to superimpose colored "touches" upon said drawing.

Like in a classical Eidophor projector for black and white television, two "bar systems" ($B_1$, $B_2$) are associated with tube $TC_2$, and lens $LC_2$ images bar system $B_1$ onto bar system $B_2$, in such a manner that a luminous ray (such as $r_1$) going through, a part of rectangle $E_2$ without deformation is stopped by bar system $B_2$, whereas a luminous ray (such as $r_2$) going through a part having a deformation goes freely through the slits of $B_2$; after objective lens LO, and after reflection on mirror M, said luminous ray $r_2$ contributes to the production (on screen EP) of the white image of the corresponding part of $E_2$, the brightness of said image being proportional to the importance of the deformation of said part of $E_2$. Therefore, in a classical manner, the desired black and white drawing is produced by Eidophor projector $TC_2$ on screen EP.

Figure 3:
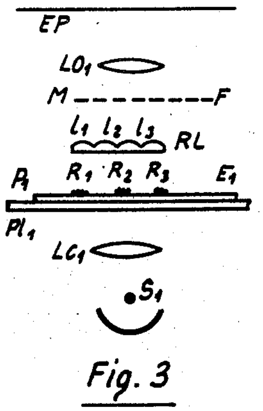
Figure 3A:
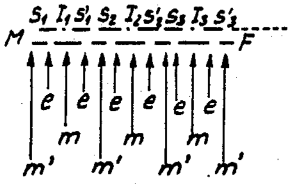
Figure 3B:
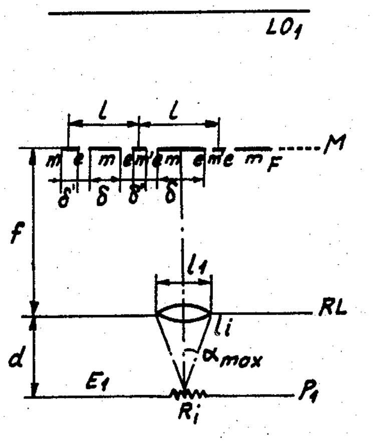

The object of the present invention is the creation (by means of tube $TC_1$) of the other "coarse colored image" of the scene being scanned at the transmitting station, in applying the principles illustrated by the appended Figures 3, 3*a* and 3*b*—or 3*d* and 3*e*, or 3*f*.

The diffraction of white light through the parts of the oil layer having a deformation producing (as explained hereafter) not only a white luminous point, but also colored spectra on both sides of said white point, it could theoretically be possible to use the same Eidophor projector for producing the drawing (under the control of the luminance signal) and the color (under the control of the chrominance signal); but there would be a risk of interference between the respective actions of luminance signal $l$ and chrominance signal ($chr$)—said interference producing either disturbing colored fringes, or undesirable color errors, on projection screen EP. The purpose of the present invention is to separate clearly the respective actions of luminance signal $l$ and chrominance signal ($chr$).

Figure 4:
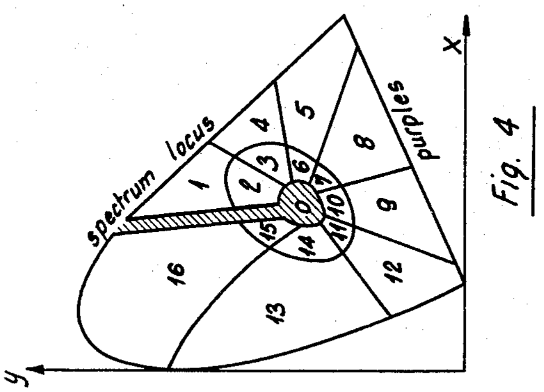

The invention will be better understood in referring to the appended drawings, in which:

Figure 1$a$ represents the left part and Figure 16 the right part of the color television receiving station in accordance with the present invention;

Figure 2$a$ shows the spectrum of the received composite video-signal V in the N.T.S.C. System;

Figure 2$b$ shows the circular diagram for the phase of the modulated color subcarrier in the N.T.S.C. System;

Figure 2$c$ represents a phase detector;

Figure 2$d$ represents the decoding electrode of the hue decoding cathode ray tube T$d$ of Figure 1;

Figures 2$e$, 2$f$ and 2$g$ show a modification of part of Figure 1;

Figures 3, 3$a$, 3$b$, 3$c$, 3$d$, 3$e$ and 3$f$ illustrate the performance of projector $TC_1$ of Figure 1, producing the coarse colored picture of the scene being scanned at the transmitting station;

Figure 4 represents the color triangle divided in sectors corresponding to the various chromaticities that the human eye can discriminate easily from each other.

Figure 4$a$ shows the saturation decoding cathode ray tube T$d'$ and the hue decoding cathode ray tube T$d$, in case of a color television system based on the color triangle of Figure 4;

Figure 1$c$ shows a single Eidophor projector TC, replacing the two Eidophor projectors ($TC_1$, $TC_2$) of Figure 1; and Figure 1$d$ shows parts of said single projector TC of Figure 1$a$. Figure 1 represents schematically the invention as applied to the American N.T.S.C. color television system.

Figure 3 shows the source of white light $S_1$ of Figure 1, as well as the collimating lens $LC_1$ and the plate $PL_1$ of tube $TC_1$ with its oil layer $P_1$. $R_1$, $R_2$, $R_3$ . . . represent elemental light diffracting gratings produced by the electrons (issued from cathode $c_1$) on part $E_1$ of oil layer $P_1$, said gratings having respectively $n_1$, $n_2$, $n_3$ . . . parallel rippled lines per millimeter; these lines (perpendicular to the plane of Figure 3) are the so called "deformation" of the oil surface due to the pressure distribution corresponding to the discrete linewise electrical charges distribution produced by the electron pencil which is horizontally deflected not only by magnetic coil $h'_1$ (energized by a sawtooth wave at the scanning lines frequency), but also by plates $h_1$ energized by a frequency modulated sine-wave as explained hereafter. In the absence of said sine-wave, a uniform distribution of electrons would be produced on the oil surface during the linear part of the sawtooth waveform applied to coil $h'_1$, and said oil surface would remain smooth; if, on the contrary, said frequency modulated sine wave is applied to plates $h_1$, the size of the electron spot varies from point to point on the oil surface, and a deformation, in form of an elemental diffracting grating $R_1$, is produced.

RL (Figure 3) is a network of small elemental lenses ($l_1$, $l_2$, $l_3$) having all the same focal length $f$, and corresponding to diffracting gratings $R_1$, $R_2$, $R_3$. The focal points of all these elemental lenses are on the same plane F which contains a mask M constituted by opaque parts ($m$, $m'$) separated from each other by transparent parts ($e$); although mask M is exactly on focal plane F, it is represented on Figure 3$a$ slightly before plane F (along the light path), in order to clarify the explanation hereafter.

If mask M did not exist, each elemental diffracting grating $R_1$ would produce (on plane F) a white image $I_1$ of light source $S_1$, and also two first order normal spectra ($s_1$ and $s_1'$) symmetrically located on both sides of said image $I_1$. In said spectra ($s_1$ or $s_1'$) the distance $d$ between central image $I_1$ and the colored line corresponding to wave-length $\lambda$ is given by the known formula:

$$d=f.\lambda.n_1$$

$n_1$ being the number of parallel lines of grating $R_1$ by unit length, because $s_1$ (or $s'_1$) is a first order spectrum, and because source $S_1$ illuminates oil layer $P_1$ at normal incidence.

Figure 3$a$ shows, for example, the luminous groups ($s_1I_1s'_1$), ($s_2I_2s'_2$), ($s_3I_3s'_3$) corresponding to elemental diffracting gratings $R_1$, $R_2$, $R_3$ of Figure 3. The opaque bands $m$ and $m'$ (of mask M) cut off the central images $I_1$, $I_2$, $I_3$ . . . as well as a great part of spectra $s_1$, $s'_1$, $s_2$, $s'_2$, $s_3$, $s'_3$ . . . Therefore the only monochromatic luminous radiations produced by the diffracting gratings which can go through transparent parts $e$ (of mask M) and reach the projection screen EP through objective $LO_1$ (Figure 1) are those having wave-lengths comprised in an interval $\Delta\lambda$ given by the formula:

$$e=\Delta d=f.n_1.\Delta\lambda$$

$n_1$ being the number of lines of grating $R_1$ per millimeter, if $f$, $\Delta d$ and $\Delta\lambda$ are also expressed in millimeters.

It is desired that $\Delta\lambda$ corresponds to nearly one third of the normal visible spectrum, which extends from red light ($\lambda_r=7.10^{-4}$ mm.) to violet-blue light ($\lambda_b=4.10^{-4}$ mm.). Therefore the order of magnitude of the width $e$ of a transparent part of mask M (Figure 3$a$) should be:

$$e=f\cdot n_1\cdot\frac{7-4}{3}\cdot 10^{-4}\text{ mm.}$$

The Eidophor television projectors commonly used for black and white televison have a hair-pin cathode producing an electron beam of 20 microamperes under an accelerating voltage of 20 kilovolts, and the associated electron optics produces, on the oil layer, an electron spot 0.02 millimeter wide and 0.1 millimeter long, said spot being one "line" of an elemental diffracting grating. It is desired that the distance between two such lines equals at least twice the width of a line, so that the maximum number of lines per millimeter is 16.

Figure 3$b$ shows with more details one elemental diffracting grating $R_1$ of oil layer $P_1$, and the corresponding elemental lens $l_1$ within the network of lenses RL of Figure 3. It is necessary that the two first order spectra ($s_1$, $s'_1$) produced by diffracting grating $R_i$ reach (entirely) the corresponding elemental lens $l_1$.

As explained hereafter, the electron beam emitted by cathode $c_1$ of tube $TC_1$ (Figure 1) produces, on successive horizontal scanning lines of rectangle $E_1$ of oil layer $P_1$, within the same elemental square of $E_1$ below lens $l_1$, different diffracting gratings ($R_b$, $R_v$, $R_r$), having appropriate numbers of lines per millimeter ($n_b$, $n_v$, $n_r$) for producing (through the transparent parts $e$ of mask M) blue, green and red lights respectively; as explained hereafter, $n_b>n_v>n_r$. The maximum diffraction angle ($\alpha_{max}$) corresponds to the red radiations (wave length $$\lambda_r=0.7.10^{-3}$$

millimeter) diffracted by the most diffracting grating $R_b$. If $l_1$ is the width of elemental lens $l_1$ (Figure 3$b$), $d$ the distance (in millimeters) between oil layers $P_1$ of tube $TC_1$ and network RL of elemental lenses, the following conditon must be fulfilled for the first order spectra:

$$\sin\alpha_{max}=n_b.\lambda_r$$
$$l_1=2d\,.\tan\alpha_{max}=2d\,.\sin\alpha_{max}=2d\,.\,n_b\,.\,\lambda_r$$

because angle $\alpha_{max}$ being small, its tangent is equal to its sinus.

It is desired that blue light goes through mask M in front of a grating $R_b$—green light, in front of a grating $R_v$—and red light, in front of a grating $R_r$.

$f$ being the focal length of all elemental lenses of network RL, and $\delta$ being the width of an opaque part ($m$) of mask M, the following equations must apply:

$$\frac{\delta}{2}=f\cdot\lambda_b\cdot n_b=f\cdot\lambda_v\cdot n_v=f\cdot\lambda_r\cdot n_r$$

As $\lambda_b=0.4\ .\ 10^{-3}$ *mm.* (blue light), $\lambda_v=0.5\ .\ 10^{-3}$ mm. (green light, and $\lambda_r=0.7\ .\ 10^{-3}$ mm. (red light), $$n_v=\frac{n_b\cdot 4}{5}\qquad n_r=\frac{n_b\cdot 4}{7}$$

For example, if $n_b=16$, $n_v=12.8$ and $n_r=9.14$. If $n_b=8$, $n_v=6.4$ and $n_r=4.57$. The distance between $P_1$ and RL (Figure 3*b*) is, in both cases determined by the above formula $$d=\frac{l_1}{2n_b\cdot\lambda_r}$$

when $l_1$ and $n_b$ are known.

The focal length $f$ of elemental lenses $l_1$ of network RL and the dimensions of the various parts ($m$, $m'$, $e$) of mask M (Figures 3*a* and 3*b*) must be such that objective lens $LO_1$ (represented by a single horizontal line on Figure 3*b*, and having a diameter of O millimeter) receives only the lights of desired colors, but also receives the colored lights of one third (blue, green or red) of each first order spectrum diffracted by the various elemental squares of rectangle $E_1$ of oil layer $P_1$ (Figure 1).

As the red radiations must (at most) reach the right end of the considered element ($m'$, $e$, $m$, $e$, $m'$) of mask M, and as this element has a width $$l=2\left(\frac{\delta}{2}+e+e\right)$$

$\delta$ being the width of an opaque part $m$, whereas $\delta'=2e$ is the width of an opaque part $m'$, the following condition must be satisfied:

$$l=2\left(\frac{\delta}{2}+e+e\right)=\delta+4e=2\cdot f\cdot n_f\cdot\lambda_r$$

Objective lens $LO_1$ must cover the 13,300 elemental squares of rectangle $E_1$ of oil layer $P_1$ (100 lines of 133 elemental squares each) in the case of the American N.T.S.C. color television system; therefore the width of mask M must be 133 $l$, and its height must be 100 $l$.

Consequently:

$$O=l\sqrt{133^2+100^2}=l\sqrt{27{,}689}=167.l$$

If, for example, O=250 millimeters, then:

$$l=\frac{250}{167}=1.49 \text{ millimeters}$$

and $$f=\frac{l}{2\cdot n_f\cdot\lambda_r}=\frac{1.49\times 10{,}000}{2\times 8\times 7}=133 \text{ millimeters}$$

in the case (mentioned above) where $n_f=8$, $n_v=6.4$, $n_r=4.57$.

Therefore:

$$\begin{cases}\delta=2f\cdot\lambda_f\cdot n_f=2\times 133\times 32.10^{-4}=0.85 \text{ mm.}\\ e=\dfrac{l-\delta}{4}=\dfrac{1.49-0.85}{4}=0.16 \text{ mm.}\\ \delta'=2e=0.32 \text{ mm.}\end{cases}$$

The mask M (the dimensions of which are so determined) can be made by photographing a much enlarged black and white drawing, upon a thin grains photographic film. The width $l_1$ of an elemental lens $l_1$ of network RL must be equal to the width $l$ of one element of mask M; therefore $l_1=1.49$ millimeter.

Rectangle $E_1$ of oil layer $P_1$ must have the same dimensions as mask M; therefore its width is $$E=133l=133\times 1.49=198 \text{ millimeters}$$

Objective lens $LO_1$, in association with the elemental lens $l_1$ of network RL, produces, on projection screen EP (Figure 1) a coarse colored picture of the scene being scanned at the distant transmitting station; if said picture has a width of C meters, and if projection screen EP is at a distance of D meters from objective lens $LO_1$ (which images rectangle $E_1$ onto screen EP), the magnification produced by this optical system is:

$$g=\frac{C}{E}$$

and the focal length of lens $LO_1$ must be:

$$F=\frac{D}{g}$$

If, for example $C=6$ meters, $D=15$ meters, as $E=0.198$ meter, $$g=\frac{600}{19.8}=30$$

and $$F=\frac{15}{30}=0.50 \text{ meter}$$

The distance between $LO_1$ and oil layer $P_1$ is of the order of 60 centimeters. The optical system, constituted by the elemental lenses of network RL and by objective lens $LO_1$, must be well corrected for achromaticity and for the field; but the conditions to be imposed for the other aberrations are much less stringent, because the colored picture to be produced on the projection screen is relatively coarse. For example 4 points of the black and white drawing produced by tube $TC_2$ (Figure 1) correspond to the same "colored touch" (or element) of said coarse colored picture; therefore the registration of said colored picture upon said drawing does not raise any difficult optical problem for mirrors $M_1$ and $M_2$ of Figure 1; moreover, some correction can be made electrically in scanning the two homothetic rectangles $E_1$ and $E_2$ (in synchronism) within tubes $TC_1$ and $TC_2$, respectively.

The prototype of lens network RL (Figure 3) is obtained in the following manner. A number of cubic elements (having 1.5 millimeter sides) are cut into a glass plate having parallel faces; these cubic elements are juxtaposed on a sphere having an appropriate radius of curvature, and they are simultaneously all shaped and polished. Then these elemental lenses are juxtaposed on a plate covered with an appropriate paste which is later polymerised by heating, in order to obtain a solid block, which is precisely the desired prototype. With this prototype as a mould, a number of lens-networks such as RL (Figure 3) can be obtained (cheaply), in Plexiglas (metachrylate of methyle).

Figure 3D:
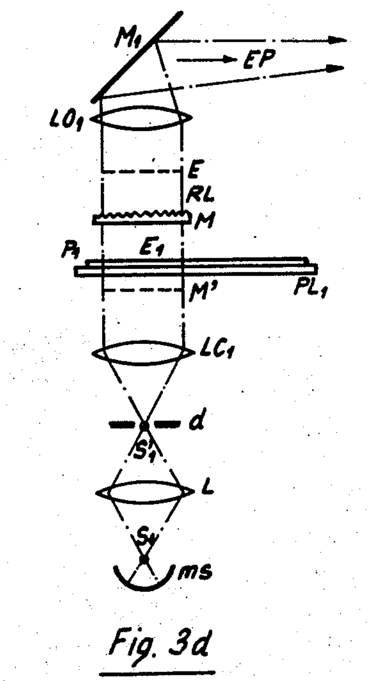
Figure 3E:
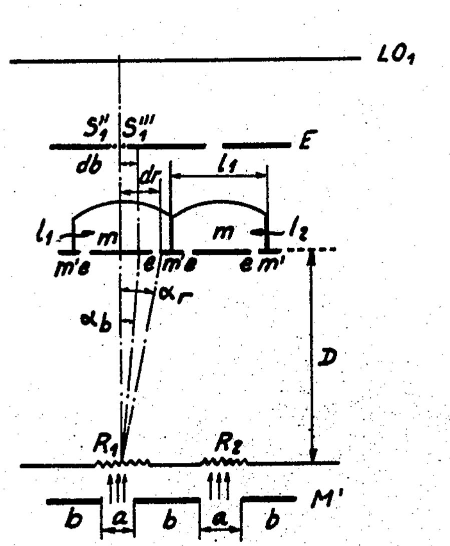

Figure 3*d* shows a modification of the optical system of Figures 1 and 3. In this case, mask M is juxtaposed to network RL of elemental lenses, as Figure 3*e* shows it in a more detailed manner. Also a bar system M' is used, having opaque parts ($b$ wide), separated by slits ($a$ wide); finally, use is also made of a screen E (provided with relatively narrow holes), located in the focal plane of the elemental lenses of network RL. The purpose of using bar system M' and screen E is: to secure a good parallelism of the white light rays illuminating (at normal incidence) the various elements of rectangle $E_1$ of oil layer $P_1$, and to cut off any stray light, other than the colored lights which it is desired to throw on projection screen EP.

On Figure 3*d*, $S_1$ is a powerful source of white light (for example, an electric arc in pressurized xenon), located at the center of a small spherical mirror *ms*, which images said electric arc onto itself. $S'_1$ is the image of $S_1$ through lens L, within the hole of diaphragm *d*. $S'_1$ is located at the focus of collimating lens $LC_1$ which illuminates (at normal incidence) rectangle $E_1$ of oil layer $P_1$, through transparent plate $PL_1$ of tube $TC_1$ (Figure 1). The electrons emitted by cathode $C_1$ of tube $TC_1$ create elemental diffracting gratings (such as $R_1$, $R_2$, above slits *a* of M', Figure 3*e*). $l_1$, $l_2$ are the elemental lenses of network RL corresponding respectively to said gratings $R_1$, $R_2$. The opaque parts (*m*, *m'*) of mask M (separated by transparent parts *e* of said mask) cover the bases of said elemental lenses $l_1$, $l_2$ as shown on Figure 3*e*. As the center of each opaque part *m* of M is just above each slit *a* of M', the non-diffracted white light is cut off by said part *m*, whereas the colored light (diffracted by grating $R_1$ for example) goes through the transparent parts *e*, both sides of *m*; therefore, at the focus of elemental lens $l_1$, are produced two small colored images ($S''_1$ and $S'''_1$) of light source $S_1$, very close to each other, inside a hole of screen E. Objective lens $LO_1$ (which in association with the elemental lenses of RL and with mirror $M_1$, images rectangle $E_1$ of oil layer $P_1$ onto projection screen EP) produces colored touches corresponding respectively to said elemental lenses, in such a manner that said touches build a coarse colored picture of the scene being scanned at the distant transmitting station.

An elemental diffracting grating $R_1$ (having $n_1$ lines per millimeter) diffracts the blue light ($\lambda_b=0.4.10^{-3}$ mm.) of an angle $\alpha_b$, and diffracts the red light ($\lambda_r=0.7.10^{-3}$ mm.) of an angle $\alpha_r$:

$$\sin \alpha_b = n_1.\lambda_b \qquad \sin \alpha_r = n_1.\lambda_r$$

These angles ($\alpha_b$, $\alpha_r$) are small enough for having a tangent equal to the sinus.

If D designates (in millimeters) the distance between oil layer $P_1$ and the juxtaposed mask M and network of lenses RL, the (normal) first order spectrum occupies (on mask M) the space limited by points distant respectively of $d_b$ and $d_r$ from the middle of opaque part m (or from the middle of the base of the corresponding elemental lens $l_1$), with:

$d_b = D \tan \alpha_b = Dn_1 \cdot \lambda_b$ (which corresponds to blue)

$d_r = D \tan \alpha_r = Dn_1 \cdot \lambda_r$ (which corresponds to red)

The transparent part (*e*) between two opaque parts (*m*, *m'*) must correspond to one third of said normal first order spectrum; therefore:

$$e = D \cdot n_i \frac{\lambda_r - \lambda_b}{3} = D \cdot n_i \cdot 10^{-4} \text{ millimeter}$$

In order to have, on projection screen EP, colors as much saturated as it is economically possible, $n_1$ should be the smallest of the numbers $n_b$, $n_v$, $n_r$, therefore $n_1$ should be made equal to 4.57. Therefore:

$$e = D \times 4.57 \times 10^{-4} \text{ millimeters} \qquad (1)$$

The opaque part *m* of mask M must have a width $\delta$ such that the following condition is satisfied:

$$\frac{\delta}{2} = D \cdot n_f \cdot \lambda_f = D \cdot n_v \cdot \lambda_v = D \cdot n_r \cdot \lambda_r$$

or $$\delta = 2D \cdot 32 \cdot 10^{-4} \qquad (2)$$

The objective-lens $LO_1$ (having a diameter O millimeters) must cover all the elements of mask M, the width of one element being:

$$l = 2\frac{\delta'}{2} + 2e + \delta = \delta + \delta' + 2e$$

$\delta'$ being the width of an opaque part *m'* of mask M. Therefore:

$$\frac{O}{167} = \delta + \delta' + 2e$$

If O=250 millimeters, this becomes:

$$\delta + \delta' + 2e = 1.49 \text{ mm.} \qquad (3)$$

The red radiation ($\lambda_r=7.10^{-4}$ mm.), when diffracted by the most diffringent grating $R_f$ ($n_f=8$ lines per millimeter), should not go further than the end of the corresponding opaque part *m'* of mask M. The limiting condition is therefore:

$$\frac{\delta}{2} + e + \delta' = D \cdot n_f \cdot \lambda_r$$

or $$\frac{\delta}{2} + e + \delta' = D \cdot 8 \cdot 7 \cdot 10^{-4} = D \cdot 56 \cdot 10^{-4} \text{ mm.} \qquad (4)$$

If Equation 4 is subtracted from Equation 3, and if account is taken of Equation 2, the following equation is obtained:

$$D = \frac{14900}{32 + 4.57 + 56} = 163 \text{ millimeters}$$

$$\text{Therefore: } \begin{cases} \delta = 2 \times 163 \cdot 32 \cdot 10^{-4} = 1.04 \text{ millimeters} \\ e = 163 \times 4.57 \cdot 10^{-4} = 0.074 \text{ millimeter} \\ \delta' = l - \delta - 2e = 1.49 - 1.04 - 0.148 = 0.302 \text{ mm.} \end{cases}$$

Again, the width of rectangle $E_1$ of oil layer $P_1$ of tube $TC_1$ (Figure 1) is $133 \cdot l = 198$ millimeters, each elemental square of said rectangle $E_1$ having sides of 1.5 millimeter.

In case of Figure 3*d*, the system made of network RL of elemental lenses and mask M can be realized in the following manner: in a rigid frame are assembled 133 strips (moulded in "Plexiglas," metachrylate of methyle) having each 100 elemental lenses 1.5 millimeter wide; this assembly is settled upon a mask M obtained by photographing a much enlarged black and white drawing on a thin grains photographic plate.

In the case of Figures 3*d* and 3*e*, the focal length of objective lens $LO_1$ can be 0.80 meter, said lens $LO_1$ being at $D=25$ meters of a projection screen $G=6$ meters wide; the magnification produced by said objective lens being $$\frac{25}{0.80} = 30$$

the distance between network RL of elemental lenses and screen E can be of the order of 50 millimeters.

Figure 3C:
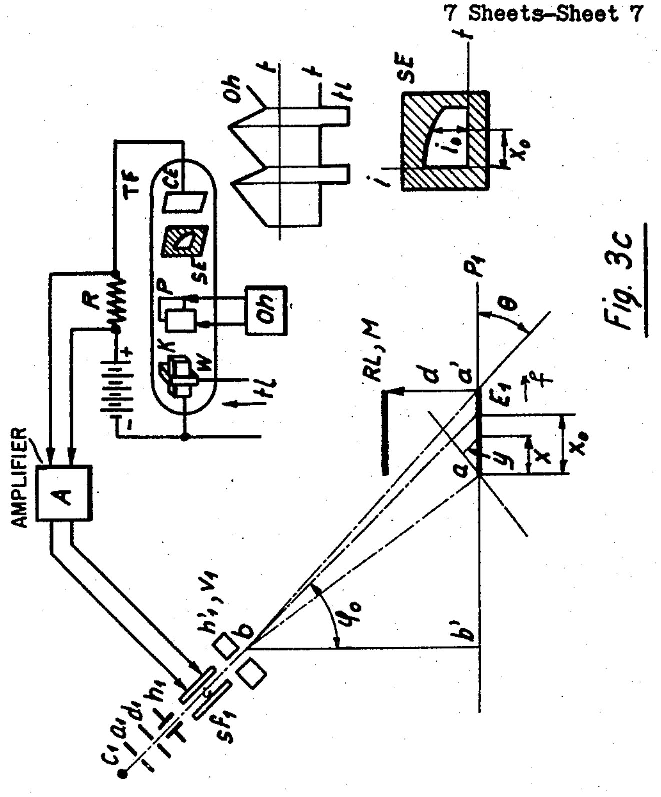
Figure 3F:
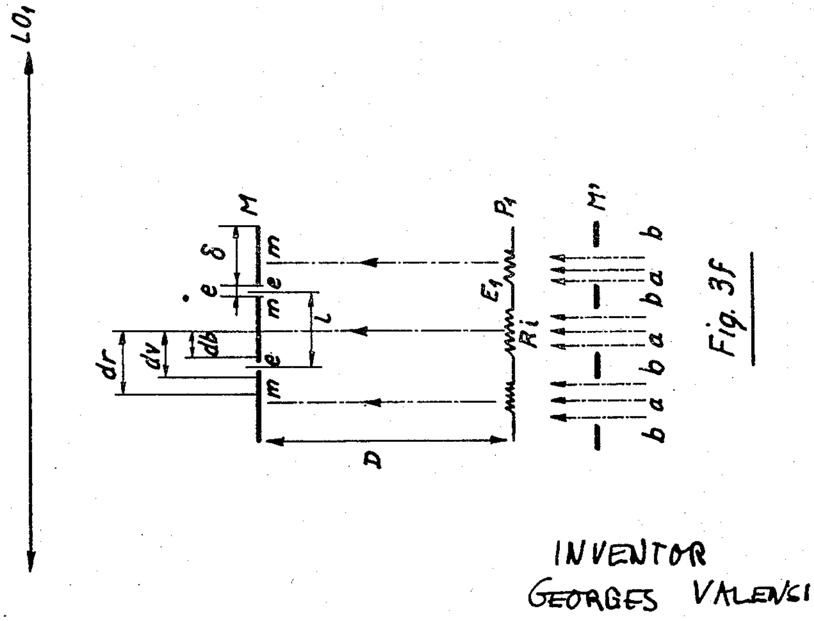

Figure 3*f* shows another modification of the optical system associated with tube $TC_1$ of Figure 1. In this case, no network of elemental lenses (such as RL, Figure 1) is used; but use is made of two bar systems M, M', conjugated with each other in such a manner that the slits (*a*) of M' are in front of the opaque parts (*m*) of M, whereas the opaque parts *b* of M' are in front of the transparent parts (*e*) of M. A powerful source of white light $S_1$ (not shown on Figure 3*f*) illuminates, at normal incidence, the oil layer $P_1$ on which the electrons, emitted by cathode $c_1$ of tube $TC_1$ (Figure 1), create elemental diffracting gratings $R_1$ on each elemental square of a rectangle $E_1$ of said oil layer $P_1$. For example, $R_1$ (Figure 3*f*) corresponds to 3 gratings ($R_b$, $R_v$, $R_r$) juxtaposed on parallel lines in a plane ($P_1$) perpendicular to the plane of Figure 3*f*, said gratings having respectively $n_b$, $n_v$, $n_r$ lines per millimeter.

Lens objective $LO_1$ (represented as a single horizontal line on Figure 3*f*) images said rectangle $E_1$ onto projection screen EP, after reflection on mirror $M_1$ (Figure 1), and objective $LO_1$ covers entirely the 100 lines of 133 elements of mask M.

Each diffracting grating ($R_1$) produces, at a distance D millimeters from oil layer ($P_1$) a central white image of source $S_1$, and, on both sides of said image, various diffraction spectra. The first order spectra are well separated from each other and quite distinct; the spectra of 2nd, 3rd orders overlap each other and are much less brighter, so that they produce (on projection screen EP) only a small diffuse white light; account should be taken of that in the adjustment of rheostat $r$, $r'$ associated with pentode L (luminance weighting device) shown on Figure 1, as explained hereafter.

In the first order diffraction spectra, the red radiations are the most distant from the middle of opaque part $m$ of mask M in front of diffracting grating $R_1$; this distance of the red radiation has the following values in case of gratings $R_b$, $R_v$, $R_r$ respectively:

$$d_b=D.n_b.\lambda_r$$
$$d_v=D.n_v.\lambda_r$$
$$d_r=D.n_r.\lambda_r$$

$(n_b>n_v>n_r)$, $d_b$, $d_v$, $d_r$ and D being expressed in millimeters and $\lambda_r=0.7\cdot10^{-3}$ millimeter.

If $\delta$ is the width of an opaque part $m$ of mask M, and if $e$ is the width of a transparent part $e$ of said mask M, an element of M has a width:

$$l=\frac{e}{2}+\delta+\frac{e}{2}=\delta+e$$

As objective lens $LO_1$ (having a diameter of O millimeters) must cover all the elements of mask M (100 lines of 133 elements), $$l=\delta+e=\frac{O}{167}$$

The greatest number of lines per millimeter of gratings $R_1$ (as mentioned above) is $n_b=16$ lines per millimeter. It is necessary that the "blue" third of first order spectrum goes alone through transparent part $e$ of mask M in case of a diffracting grating $R_b$—that the "green" third alone goes through ($e$) in case of a diffracting grating $R_v$—and that the "red" third alone goes through ($e$) in case of a diffracting grating $R_r$. Therefore:

$$\frac{\delta}{2}=D.n_f.\lambda_f=D.n_v.\lambda_v=D.n_r.\lambda_r$$

Two cases can be considered:

1st case:
$n_b=16$ $n_v=16\times4/5=12.8$ $n_r=16\times4/7=9.14$
2nd case: $n_b=8$ $n_v=6.4$ $n_r=4.57$ In order to obtain saturated colors on projection screen EP (Figure 1), the width $e$ of a transparent part ($e$) of mask M should be equal to the third of the width of the first order spectrum diffracted by the least diffracting grating; therefore:

$$e=D.n_r\frac{7-4}{3}10^{-4}=D.n_r.10^{-4}\text{ millimeter}$$

For determining D, $\delta$, and $e$, the three above equations must be used:

$$\delta+e=\frac{O}{167}$$

$$\frac{\delta}{2}=D.n_f.\lambda_f$$

$$e=D.n_r.10^{-4}\text{ mm.}$$

In the first case ($n_b=16$; $n_v=12.8$; $n_r=9.14$), with $O=250$ mm., the following values are obtained:

$$\begin{cases}D=\dfrac{1.49\times10{,}000}{2\times16\times4+9.14}=108\text{ millimeters}\\ \delta=2\times108\times16\times4.10^{-4}=1.38\text{ millimeters}\\ e=108\times9.14.10^{-4}=0.0987=0.1\text{ millimeter}\end{cases}$$

In the second case: $D=217$ mm., $\delta=1.39$ mm., $$e=0.099=0.1\text{ mm.}$$

Some care must be taken for focusing, in an appropriate manner, the electrons on the oil layer during all the scanning of said layer by the electron pencil. Figure 3$c$ shows the rectangle $E_1$ of oil layer $P_1$ of tube $TC_1$ of Figure 1, and shows also a horizontal segment marked (RL, M) having the same width as rectangle $E_1$; this segment is the network RL of elemental lenses in case of Figure 3$b$, or Figure 3$d$, and is the mask M in case of Figure 3$f$. (RL, M) is, in any case, an obstacle for the electron pencil, so that the angle between the electron pencil scanning rectangle $E_1$ and the oil layer must be less than 50 degrees (see hereafter). $aa'$ (Figure 3$c$) represents one horizontal scanning line, $c_1$ the cathode of tube $TC_1$, $a_1$ the anode, $d_1$ the diaphragm (cross-over), $h_1$ the auxiliary horizontally deflecting plates energized by the frequency modulated wave $A_1$. sin $w_1t$, $sf_1$ the focussing solenoid, and $h'_1$, $v_1$ the yoke made of the horizontally deflecting coil $h'_1$ and the vertically deflecting coil $v_1$ (Figure 1); $h'_1$ and $v_1$ move the electron spot (over rectangle $E_1$) with constant velocities ($v_h$ for horizontal scanning, and $v_v$ for vertical scanning), while plates $h_1$ make the electron spot vibrate at the instantaneous frequency $$\frac{\omega_1}{2\pi}=f_{11}$$

The focal length F of solenoid $sf_1$ (having a winding of $n$ turns, with a mean radius $r$ centimeters, and through which flows an electric current of $i$ amperes) is given by the formula:

$$F=100\frac{V_r}{n^2i^2}\text{ centimeters}$$

V being the voltage accelerating the electrons, in volts.

$c$ being the center of solenoid ($sf_1$) and $b$ the point where the yoke ($h'_1$, $v_1$) is located, the electric current $i$ must vary, as a function of time $t$, in such a manner that the electrons remain focussed on oil layer $P_1$ during all the scanning of the horizontal lines ($aa'$) of $E_1$, in the direction of arrow $f$.

If $ab$ is relatively large in comparison with $aa'$ (Figure 3$c$), the angle between the perpendicular $bb'$ on oil layer $P_1$ and the electron pencil may be considered as nearly constant and equal to $\varphi_0$ ($\varphi_0$ being the angle between $bb'$ and the straight line joining point $b$ to a point of abscissa (referred to point $a$) $X_0=\frac{3}{5}E$ for example (E being the width of rectangle $E_1$, and $\theta$ the minimum angle between the electron pencil and oil layer $P_1$).

Let $i_0$ be the intensity of the electric current in the winding of soleoid ($sf_1$) corresponding to a perfect focussing of the electrons on $P_1$ when the electron spot is precisely at said point of abcissa $X_0$, on scanning line $aa'$.

If current $i$ varies as a function of time $t$ in accordance with the following equation:

$$100\frac{V_r}{n^2i^2}=ca+y=ca+x\sin\varphi_0=ca+(v_h\sin\varphi_0).t$$

or $$i=\sqrt{\frac{100V_r}{n^2[ca+(v_h\sin\varphi_0)t]}}$$

only very small "aberrations" of the electronic image of the cross-over $d_1$ (on oil layer $P_1$) may occur during the scanning of rectangle $E_1$.

This time variation of electric current $i$ is automatically produced by means of "formation TF" shown at the right of Figure 3$c$: TF is a cathode ray tube having a rectilinear vertical cathode K, a Wenhelt cylinder W, a pair of horizontally deflecting plates P, a slotted electrode SE, and a collecting electrode CE. Cylinder W controls the intensity of the flat electron beam produced by cathode K; plates P are energized by the relaxation oscillation generated by oscillator $O_h$ (Figure 1), for the horizontal scanning (at constant velocity $v_h$) of rectangle $E_1$; therefore the vertical electronic image of cathode K moves along the slot of electrode SE in synchronism with said horizontal scanning of $E_1$.

The lines synchronizing pulses $t_1$ (received from the distant television transmitting station) are applied to cathode K and cylinder W of tube TF, in order to cut off the electron beam during the rapidly decreasing part of the waveform of the relaxation oscillation produced by $O_h$ (see, on Figure 3*c*, the lines representing, as functions of time *t*, said relaxation oscillation and said lines synchronizing pulses $t_l$). The slotted electrode SE (represented at the bottom of the right side of Figure 3*c*) is provided with a slot having a lower horizontal edge and an upper edge of a shape corresponding precisely to the above formula:

$$i=\sqrt{\frac{100V_r}{n^2[ca+(v_h \sin \varphi_0)t]}}$$

Therefore, at each instant, collecting electrode CE (which collects the electrons passing through the slot of SE) produces, across output resistor R, an electric voltage, which, after amplification through A, energizes focussing solenoid ($sf_1$) with the desired electric current *i*. Tube T and amplifier A constitute the device $Th_1$ of Figure 1; $Th_2$ is a similar arrangement associated with tube $TC_2$. The minimum angle between the electron pencil and the oil layer $P_1$ of tube $TC_1$ (Figures 1 and 3*c*) is given by the formula:

$$\theta=\text{arc} \tan \frac{d}{E}$$

with $E=198$ millimeters and the maximum variation of the focal length F of focussing solenoid ($sf_1$) acting as a magnetic lens is:

$$\Delta F=E \cos \theta$$

In case of Figure 3*b*, $d=133$ mm., $\tan \theta=^{133}/_{198}=0.67$, $\theta=33.9$ degrees, $\cos \theta=0.83$ and $\Delta F=198\times0.83=164$ millimeters.

In case of Figure 3*d*, $d=163$ mm., $\tan \theta=^{163}/_{198}=0.82$, $\theta=39.4$ degrees. $\cos \theta=0.77$ and $\Delta F=198\times0.77=152$ millimeters.

In case of Figure 3*f*: (1) If $n_b=16$, $n_v=12.8$, $n_r=9.14$, then $d=108$ mm., $\tan \theta=^{108}/_{198}=0.54$, $\theta=28.4$ degrees, $\cos \theta=0.88$ and $\Delta F=198\times0.88=174$ millimeters.

(2) If $n_b=8$, $n_v=6.4$, $n_r=4.57$, then $d=217$ millimeters, $\tan \theta=^{217}/_{198}=1.09$, $\theta=47.4$ degrees, $\cos \theta=0.676$ and $\Delta F=198\times0.676=132.6$ millimeters.

If distance *ba* (Figure 3*c*), between the yoke and the oil layer along the shortest length of the electron pencil is of the order of 50 centimeters, the abberations of the electron spot of the oil layer at both ends of a scanning line can be tolerated.

Referring again to Figure 1, plates $h_2$ are energized by a sine-wave $A_2.\sin \omega_2 t$ (generated by oscillator $O_2$) having a constant frequency $$\left(\frac{\omega_2}{2\pi}\right)$$

and an amplitude modulated by modulator ($md_2$) under the control of a "weighted luminance signal" obtained at the output of electronic mixer ($mxl$), as explained hereafter, electric filter $F_4$ suppressing the carrier and one side-band; plates $h_1$ are energized by a sine-wave $C_3=A_1.\sin \omega_1 t$ generated by oscillator $O_1$ and frequency modulated by modulator ($md_1$), as explained hereafter; this wave ($C_3=A_1.\sin \omega_1 t$) controls the production of elemental diffracting gratings on the surface of oil layer $P_1$, inside the various elemental squares of rectangle $E_1$ corresponding to the various colored "touches" superimposed by objective $LO_1$ on the detailed black and white drawing produced by objective $LO_2$ on projection screen EP.

Figure 1C:
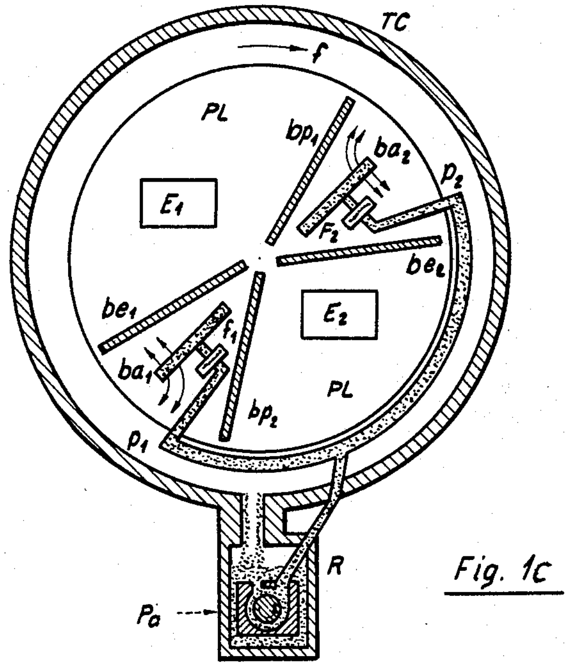
Figure 1D:
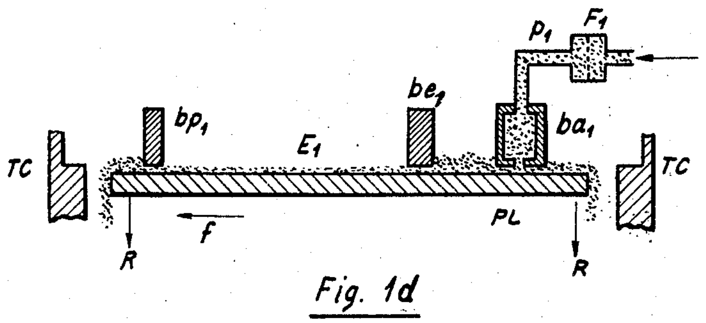
Figure 2C:
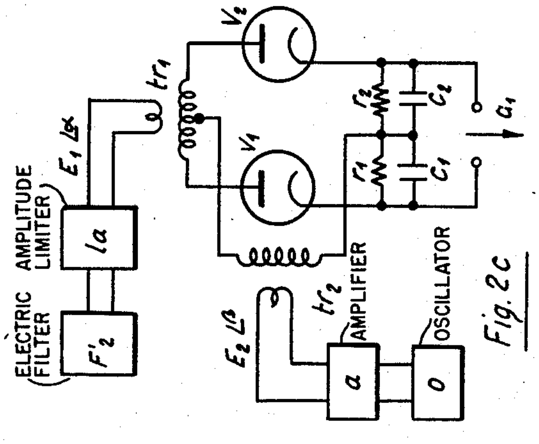
Figure 2B:
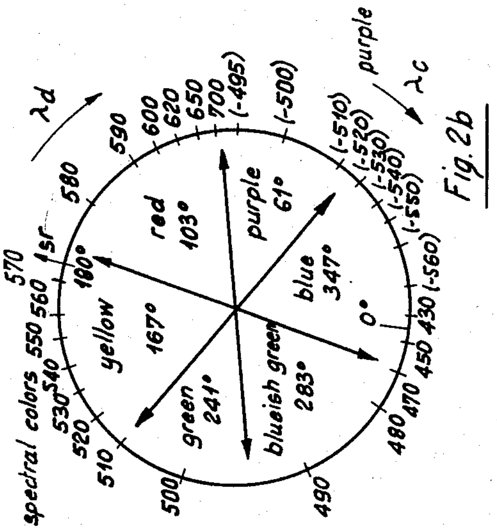
Figure 2A:
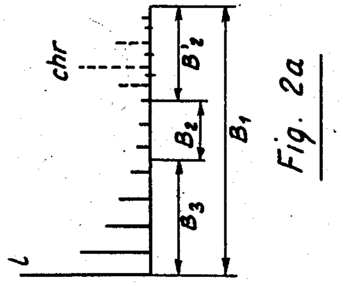
Figure 2G:
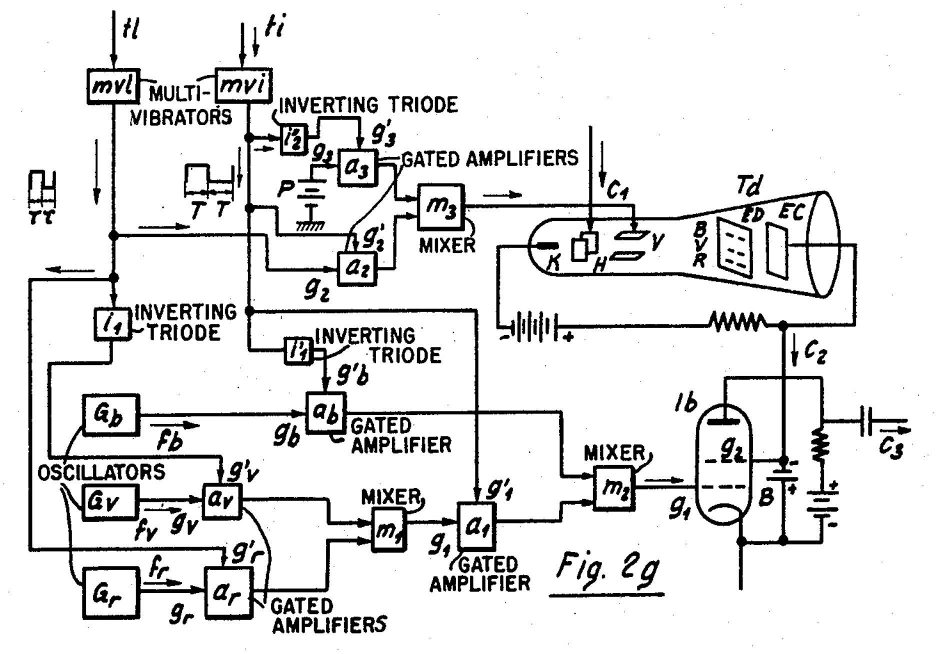
Figures 2E, 2F:
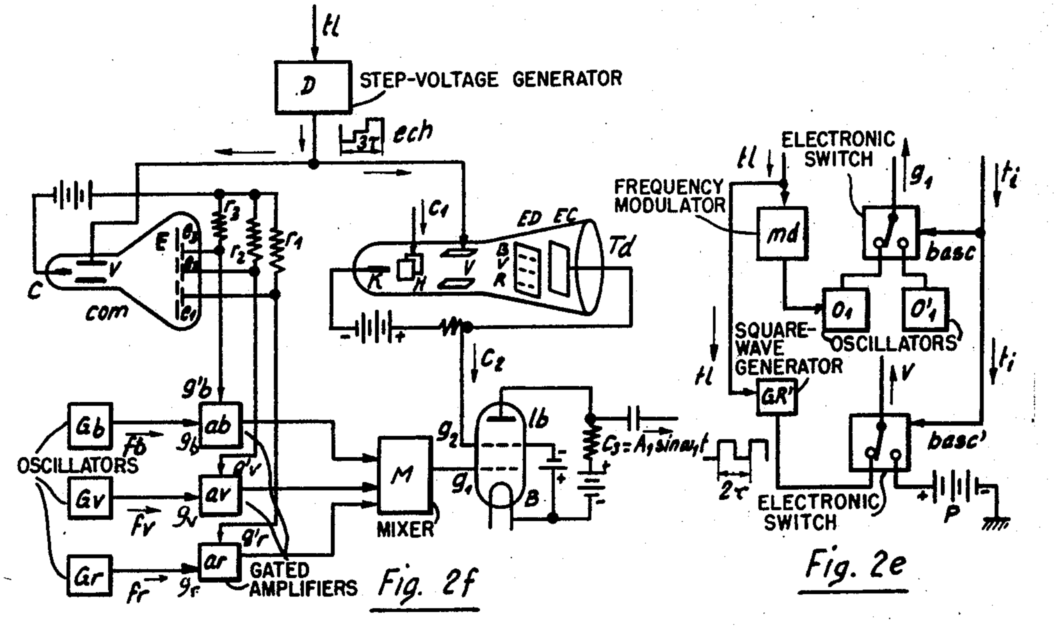

The frequency $$\left(f_1=\frac{\omega_1}{2\pi}\right)$$

of wave $C_3=A_1.\sin \omega_1 t$ varies (as a function of time *t*) by successive steps, under the control of a device (described hereafter and shown on Figure 1, or on Figure 2*f*, or on Figure 2*e*, or on Figure 2*g*). Said frequency modulated wave ($A_1.\sin \omega_1 t$ is applied to the control grid $g_1$ of a gated amplifier (tetrode *lb*), the gating grid $g_2$ of which is energized by the output $C_2$ of "hue decoding cathode ray tube T*d*." This tube T*d* is itself controlled by the output voltage $C_1$ of a phase detector DP (represented schematically on Figure 2*c*); to said phase detector DP are applied simultaneously, on one side, the amplified voltage of oscillator O (having same frequency and phase as the "color burst *sr*," or as the oscillator generating the color subcarrier at the distant transmitting station), and, on the other side, through amplitude limiter (*la*), the received chrominance signal (*chr*) the phase of which characterizes the hue of the color to be reproduced; therefore the voltage $C_1$, obtained at the output of phase detector DP, proportional to the cosine of the phase-shift between signals (*chr*) and (*sr*), characterizes also the color to be reproduced.

For the "step by step" modulation of the frequency $f_1$ of oscillator $O_1$, any type of telegraphic frequency modulator may be used. For example the step-voltage "*ech*" (Fig. 1, having 3 successive values in each period) is applied to the conveniently biased grids of triodes, the outputs of which short-circuit (or insert) successively (without inertia) one or two parts of the inductance coil *l* (or of the capacitor *c*) of the anti-resonant circuit (*lc*) of an electronic tube having its grid and plate circuits coupled together, so that this tube oscillates with a frequency $$\left(f_1=\frac{1}{2\pi\sqrt{lc}}\right)$$

which varies step by step as a function of time; in this manner, it is possible to produce frequency deviations which are great by comparison with the basic frequency.

The number of lines $n_1$ (per millimeter) of an elemental diffracting grating $R_1$ produced on oil layer $P_1$ of cathode ray tube $TC_1$ by the electrons issued from cathode $c_1$ is a function of the "instantaneous frequency"

$$\left(f_{1i}=\frac{\omega_1}{2\pi}\right)$$

of the frequency modulated wave ($C_3=A_1 \sin \omega_1 t$) applied to the plates $h_1$ which make horizontally vibrate the electron pencil produced by cathode $c_1$. At each instant, this number of lines $n_1$ must be such that only the monochromatic radiations having wave lengths close to a value $\lambda_1$ (corresponding to the received chrominance signal (*chr*), and, therefore, to the hue of the color to be reproduced) can go through the transparent parts (*e*) of mask M in front of grating $R_1$, in order to produce, on projection screen EP, a luminous spot having the desired color.

As an elemental diffracting grating is produced by an electron spot (on the oil layer) having a width of 0.02 millimeter and a length of 0.1 millimeter, it is possible to have a few elemental gratings in an elemental area (square of 1.5×1.5 millimeter) within rectangle $E_1$ of oil layer $P_1$ (Figure 1), which corresponds to the coarse colored picture to be produced on projection screen EP; various combinations of gratings (giving blue, or green, or red light, respectively) within the same elemental square of rectangle $E_1$ may be considered; two such combinations are described hereafter, in way of examples only, being understood that many other combinations could be realized within the frame of the present invention.

In the first case considered hereafter, six gratings (having each a height of 0.1 millimeter) are located inside said elemental square (height 1.5 millimeters) of rectangle $E_1$ of oil layer $P_1$. Said rectangle $E_1$ is horizontally scanned by the interlace process, each horizontal line being swept by the electrons during $$\tau=\frac{1}{15{,}750}\text{ second}$$

in the American television standards. In the case of Figure 1 (N.T.S.C. color television system), there are 133 elemental squares in rectangle $E_1$, and therefore each elemental square is swept during a time $$t=\frac{\tau}{133}=\frac{1}{2.1.10^6}$$

or approximately ½ microsecond.

If, on three successive lines of the same field (lines $q$, $q+2$, $q+4$) are produced successively (within a given elemental square of $E_1$) a grating $R_r$ giving red light, a grating $R_v$ giving green light, and a grating $R_b$ giving blue light, and if the same process is applied to lines $(q+1)$, $(q+3)$ and $(q+5)$ of the following field, it is apparent that, on said six lines ($q$ to $q+5$), the color to be reproduced (for the considered elemental area of the scene scanned at the transmitting station) will be obtained twice inside this elemental square of rectangle $E_1$.

In the second case hereafter considered, (within a given elemental square of $E_1$), a grating $R_r$ for red and a grating $R_v$ for green are alternately produced on two successive lines of the same field (lines $q$ and $q+2$, for example), whereas gratings $R_b$ for blue are produced on all the lines of the field which follows (lines $(q+1)$, $(q+3)$, etc.); a color filter absorbing slightly the blue luminous radiations can, in this case, be located in front of mirror $M_1$ of Figure 1; said color filter is not shown on Figure 1.

As an elemental square of rectangle $E_1$ is swept during a tme $$t=\frac{1}{15{,}750\times133}=\frac{1}{2.1.10^6}\text{ second}$$

the instantaneous frequency $f_{1i}$ of the wave $$(C_3=A_1.\sin\omega_1t)$$

applied to deflecting plates $h_1$ must have the following value, in order to produce a grating $R_i$ of $n_i$ lines per millimeter in the first and second cases mentioned above:

$$f_{1i}=\frac{n_i}{t}=n_i.2.1.10^6\text{ hertz}$$

The values of the instantaneous frequency $f_{1i}$ corresponding to the creation of blue, green or red lights on projection screen EP are therefore:

(1) In the case where:

$n_b=8$, $n_v=6.7$ and $n_r=4.57$
$f_b=8\times2.1=16.8$ megahertz
$f_v=6.4\times2.1=13.44$ megahertz
$f_r=4.57\times2.1=9.59$ megahertz (2) In the case where:

$n_b=16$, $n_v=12.8$ and $n_r=9.14$
$f_b=33.6$ megahertz
$f_v=26.88$ megahertz
$f_r=19.18$ megahertz.

In an Eidophor projector, the voltage to be applied to the auxiliary deflecting plates ($h_1$ or $h_2$ on Figure 1) is of the order of 1 volt only; oscillators $O_1$ and $O_2$ (Figure 1) are therefore of the low power, high frequency type.

In the first case (considered hereabove), the frequency $f_1$ of oscillator $O_1$ must have the instantaneous value $f_r$ during $$\tau=\frac{1}{15{,}750}\text{ second}$$

(duration of one scanning line in the American television standards), then, the value $f_v$ during the following period $\tau$, then the value $f_b$ during the next period $\tau$, and so on. For achieving that, use can be made of generator GR (Figure 1) producing square waves having a period equal to $3\tau$ (said generator GR being synchronized by the received line synchronizing pulses $t_l$ at scanning lines frequency).

CD is a "differentiating circuit" (the word "differentiating" having its mathematical meaning), producing a positive "pip" for the initial rise of each pulse, and a negative "pip" for the final transient part of said pulse. These "pips" trigger two multivibrators (MV, MV') producing two similar square-wave outputs, 180 degrees out of phase, one pulse (of each cycle) having a duration $2\tau$, whereas the pulse of the other has a duration of $\tau$. After passing through a clipper in each channel (*dc*, *dc'*), these two pulse signals are mixed in electronic mixer MX, to achieve a 3 step-voltage wave-form with a step duration of $\tau$. After amplification by amplifier AM, the desired 3 step-voltage "*ech*" (having three successive values in each period $3\tau$) is obtained, said values corresponding to the ratios between the desired instantaneous frequencies for the wave $C_3=A_1\,.\,\sin\omega_1t$, that is to say: *fr, fv, fb*.

This 3 step-voltage (*ech*) modulates the frequency $$\left(f_1=\frac{\omega_1}{2\pi}\right)$$

of the sine-wave generated by oscillator $O_1$, by means of the frequency modulator (*mdl*) of telegraphic type.

The frequency modulated wave ($C_3=A_1\,.\,\sin\omega_1t$) is applied to the control grid $g_1$ of gated amplifier *lb*, the gating grid $g_2$ of which is controlled by the output of hue decoding tube T*d*, and is negatively biased by battery B.

Decoding tube T*d* (Figure 1) has a small cathode K, horizontally deflecting plates H (energized by phase detector DP), vertically deflecting plates V (energized by the 3-step voltage "*ech*" of period $3\tau$), a decoding electrode ED (represented on Figure 2*d*, and having 3 slits R, V, B), and a collecting electrode EC behind said slits. At each instant, the electronic image of cathode K is (under the control of 3 step-voltage "*ech*") located at the level of one of said 3 slits of decoding electrode ED, at a point determined by the voltage $C_1$ (produced at the output of phase detector DP and applied to deflecting plates H). Said electronic image is, in case of Figure 1, on slit R (corresponding to red primary color) during a time $\tau$, then, on slit V (corresponding to green primary color) during the following period $\tau$, then, on slit B (corresponding to blue primary color) during the following period $\tau$, and so on, under the control of 3 step-voltage "*ech*" applied to plates V of tube T*d*.

The voltage $C_1=2E_1\,.\,\cos(\alpha-\beta)$, as explained hereafter, characterizes the hue of the color to be reproduced, and is therefore called hereafter "hue signal"; acting on plates H of tube T*d*, said hue signal positions, at each instant, the electronic image of cathode K on a particular vertical line of decoding electrode ED cutting one, or two, or three slits (R red, V green, B blue) if one, or two, or three primary colors are necessary for the reproduction of the color on the corresponding part of projection screen EP.

If, at a given instant, the electronic image of cathode K is on a solid part of decoding electrode ED, no electron can reach collecting electrode EC, and the output voltage $C_2$ of tube T*d* is unable to equalize (or exceed) the bias B of gating grid $g_2$ of tetrode *lb*; therefore the signal $C_3=A_1\,.\,\sin\omega_1t$ is no longer applied to plates $h_1$ of tube $TC_1$; a uniform distribution of electrons takes place on oil layer $P_1$ because only the linear part of the sawtooth wave of oscillator O*h* (acting on coil $h'_1$) moves the electron pencil of tube $TC_1$; the oil layer $P_1$ has no deformation (no grating) at this place; no light is produced by tube $TC_1$ on the corresponding point of projection screen EP.

If, on the contrary, at a given instant, the electronic image of cathode K is, for example, on a point of slit V of electrode ED, collecting electrode EC receives electrons, and (at the output of tube T*d*) a signal $C_2$ is produced with an intensity exceeding the voltage of battery B biasing gating electrode $g_2$ of tube *lb*; the frequency modulated wave ($C_3=A_1$. sin $\omega_1 t$) applied to control grid $g_1$ of *lb* is amplified, and reaches plates $h_1$ of tube $TC_1$; precisely, at this instant, the instantaneous frequency $$\left(f_{1i}=\frac{\omega_1}{2\pi}\right)$$

of $C_3$ has the value $f_v$ necessary for producing, on oil layer $P_1$ in tube $TC_1$, an elemental diffracting grating $R_v$ having $n_v$ lines per millimeter and giving green light (through mask M and objective lens $LO_1$) on the appropriate point of projection screen EP, because rectangles $E_1$ and $E_2$ of oil layers $P_1$ and $P_2$ (Figure 1) are homothetic, and are scanned in perfect synchronism, with the same relaxation oscillators $O_h$ and $O_v$.

Instead of the frequency modulator *mdl* shown at the bottom of the left of Figure 1, use can be made of the device shown on the appended Figure 2*f*. $G_b$, $G_v$, $G_r$ represent oscillators generating for example sine-waves having respectively the frequencies $f_b$, $f_v$, $f_r$ proportional to the numbers ($n_b$, $n_v$, $n_r$) of lines per millimeter of the elemental diffracting grating $R_b$, $R_v$, $R_r$; these waves are applied respectively to the control grids ($g_b$, $g_v$, $g_r$) of amplifiers $a_b$, $a_v$, $a_r$, the gating grids of which are $g'_b$, $g'_v$, $g'_r$. D is the arrangement of Figure 1 generating a three-step voltage (*ech*) having a period $3\tau$ ($\tau$ being the duration of one scanning line); D is synchronized by the lines synchronizing pulses $t_l$ coming from the distant television transmitting station.

(*com*) is a 3 contact beam switching tube; for example, as shown on Figure 2*f*, (*com*) is a cathode ray tube having a cathode *c*, vertically deflecting plates V, an electrode E provided with 3 holes above each other and behind which are located three collecting electrodes $e_1$, $e_2$, $e_3$ connected respectively to three output resistors $r_1$, $r_2$, $r_3$. The voltages produced across said resistors are applied to the gating grids $g'_b$, $g'_v$, $g'_r$ of amplifiers $a_b$, $a_v$, $a_r$ respectively. T*d* is the hue decoding tube of Figure 1, and *lb* is its associated tetrode acting as gated amplifier, with a control grid $g_1$ and a gating grid $g_2$, negatively biased by battery B and controlled by signal $C_2$ produced by tube T*d*. The vertically deflecting plates *v* of tube (*com*) and V of tube T*d* are both energized by said 3 step voltage (*ech*). The plates of amplifiers $a_b$, $a_v$, $a_r$ are connected to electronic mixer M which feeds the control grid $g_1$ of tetrode *lb*.

When the electronic image of cathode *c* of tube (*com*) is successively in front of collecting electrodes $e_1$, $e_2$, $e_3$ (during three successive scanning lines of duration $\tau$), the electronic image of cathode K of tube T*d* is precisely at the level of slits R (red), V (green) and B (blue) of decoding electrode ED of tube T*d*, successively; and, precisely, at the same instants, the voltages across resistors $r_1$, $r_2$, $r_3$ (acting on gating grids $g'_r$, $g'_v$, $g'_b$ of amplifiers $a_r$, $a_v$, $a_b$) unblock successively said amplifiers; therefore control grid $g_1$ of tetrode *lb* receives successively the frequency modulated sine wave $C_3=A_1$. sin $\omega_1 t$ (to be applied to deflecting plates $h_1$ of tube $TC_1$, Figure 1) with the successive instantaneous frequencies ($f_r$, $f_v$, $f_b$) which are necessary for creating the elemental diffracting gratings $R_r$, $R_v$, $R_b$ on rectangle $E_1$ of oil layer $P_1$ of said tube $TC_1$.

In the second case considered above, the instantaneous frequency $f_{1i}$ of wave $A_1$ sin. $\omega_1{}^t$ must have the value $f_r$ during a period $$\tau=\frac{1}{15{,}750}\text{ second}$$

then the value $f_v$ during the following period $\tau$, and so on during two successive lines of the first field; during all the second field (in interlace scanning), the frequency $f_{1i}$ must keep the same value $f_b$.

In this case, instead of the device represented at the bottom (on the left) of Figure 1, for generating the frequency modulated wave $C_3=A_1 \cdot \sin\, \omega_1 t$, use is made of the device shown on Figure 2*e*. $O'_1$ is an oscillator generating a wave of constant frequency $f_b$. $O_1$ is an oscillator generating a wave of frequency $f_{1i}$ having the value $f_r$ during a period $\tau$, when all its inductance coil *l* (or all its capacitor *c*) is inserted in the anti-resonant circuit, and having the value $f_v$ during the following period $\tau$ when an appropriate part of said inductance coil *l* (or of said capacitor *c*) is short-circuited, the frequency ($f_{1i}$) being $$f_{1i}=\frac{1}{2\pi\sqrt{lc}}$$

The electronic device *md* (Figure 2*e*), synchronized by the received line synchronizing pulses $t_l$, operates $$\left(\text{every } 2\tau \text{ second}=\frac{2}{15{,}750}\text{ second}\right)$$

this short-circuiting of part of coil *l* (or part of capacitor *c*); the electronic switch (*basc*), synchronized by the received field synchronizing signals $t_t$, connects alternately, in two successive fields, oscillator $O_1$ and oscillator $O'_1$ to the control grid $g_1$ of gated amplifier *lb* of Figure 1.

At the same time, the vertically deflecting plates V of tube T*d* (Figure 1) are energized by the device shown on Figure 2*e*: GR′ is a generator of a square-wave of period $2\tau$ (one pulse $\tau$ wide, every period), synchronized by the received lines synchronizing pulses $t_l$, and bringing the electronic image of cathode K of tube T*d* successively at the level of slit R and at the level of slit V of decoding electrode ED of tube T*d* during two successive scanning lines of one field, when electronic switch (*basc′*) is on its left hand side contact; during all the following field, electronic switch (*basc′*)—synchronized by the received field synchronizing signals $t_t$—is on its right hand contact and connects plates V to a battery P producing (across plates V) a voltage bringing the electronic image of said cathode K at the level of slit B of said electrode ED.

Instead of the device shown on Figure 2*e*, use can be made of the device shown on Figure 2*g*. $\tau$ being the duration of one scanning line and T the duration of one field, use is then made of two multivibrators: (*mvl*), producing one square pulse $\tau$ wide every 2 $\tau$ seconds, and (*mvi*), producing one square pulse T wide every 2T seconds. These two multivibrators are respectively synchronized by the received lines synchronizing pulses $t_l$ and by the received field synchronizing signals $t_t$.

(*mvl*) controls directly the gating grid $g'_r$ of amplifier $a_r$ fed by $G_r$, which generates a sine-wave of frequency $f_r$; (*mvl*) controls indirectly (through inverting triode $i_1$) the gating grid $g'_v$ of amplifier $a_v$ fed by $G_v$, which generates a sine-wave of frequency $f_v$. The output voltages of amplifiers $a_r$ and $a_v$ are applied to electronic mixer $m_1$.

(*mvi*) controls directly the gating grid $g'_1$ of amplifier $a_1$ which is fed by electronic mixer $m_1$; *mvi* controls indirectly (through inverting triode $i'_1$) the gating grid $g'_b$ of amplifier $a_b$, which is fed by $G_b$ generating a sine-wave of frequency $f_b$. The output voltages of amplifiers $a_1$ and $a_b$ are applied to electronic mixer $m_2$, which energizes the control grid $g_1$ of tetrode *lb*, whereas the gating grid $g_2$ of said tetrode *lb* is negatively biased by battery B and is also submitted to the control of signal $C_2$ produced at the output of hue decoding tube T*d*. The horizontally deflecting plates H of T*d* are energized by hue signal $C_1$, whereas the vertically deflecting plates V are energized by electronic mixer $m_3$ to the input of which are applied: (1) through amplifier $a_2$ the wave produced by ($mvi$), and (2) through amplifier $a_3$ a positive D.C. voltage due to battery P. The gating grid $g'_2$ of amplifier $a_2$ is directly controlled by ($mvi$), and the gating grid $g'_3$ of amplifier $a_3$ is indirectly controlled (through inverting triode $i'_2$) by ($mvi$). During the field when $a_2$ is unblocked, plates V of tube T*d* position the electronic image of cathode K successively at the level of slit R and at the level of slit V of ED during two successive scanning lines; during the following field, $a_3$ is unblocked and said electronic image of K is positioned at the level of slit B of ED.

Several modifications may be done in the electronic devices (described hereabove) for producing a wave of varying periodicity in order to create elemental diffracting gratings on oil layer $P_1$ of tube $TC_1$ (Figure 1). For example, instead of applying to horizontally deflecting plates $h_1$ of tube TC a sine-wave of variable frequency ($A_1 . \sin \omega_1 t$), use can be made of periodic wave-shapes other than a sinusoid; for example, oscillators $O_1$ and $O'_1$ (Figure 2*e*), or devices $G_b$, $G_v$, $G_r$ (Figure 2*f* or Figure 2*g*) can generate saw-tooth waves, or rectangular waves, having appropriate fundamental frequencies; if a rectangular wave-form is used, the ratio between the duration of the rectangular pulse and the time interval between 2 consecutive pulses should have an appropriate value.

As the intensity (but not the positions) of the diffraction spectra depends on the ratio between the width of a line and the distance between two consecutive lines of the diffracting grating, it is possible to use, as generators $G_b$, $G_v$, $G_r$ of periodic waves of respective periodicities $f_b$, $f_v$, $f_r$ (Figure 2*f*, or Figure 2*g*), devices generating periodical rectangular waves, having (in each period) a pulse, the duration of which is function of the low-frequency part $l'$ of the received luminance signal, but only when the elemental area of the scene (being scanned at the transmitting station) to be reproduced on the projection screen at the receiving station has a uniform, very saturated color, with brightness variations from one point to the other.

Such a device comprises: (1) a multivibrator MV generating a rectangular wave of desired periodicity, (2) a modulator MA, for modulating the amplitude of the rectangular pulse within the successive periods, (3) a converter (CAD) for changing the pulse-amplitude-modulation into a pulse-duration-modulation, and (4) an amplifier $A_m$, to the control grid of which is applied said low-frequency part $l'$ of the luminance spectrum, whereas its gating grid is negatively biased by a battery, and is also submitted to the action of saturation signal S (which is proportional to the degree of saturation of the color to be reproduced).

The output voltages of amplifier $A_m$ and of multivibrator MV are applied to amplitude modulator MA; but $A_m$ is blocked except when a very saturated color must be reproduced, so that saturation signal S then exceeds the value of the negative bias of the gating grid.

Only in such a case, amplifier $A_m$ is active, and applies (with the desired amplitudes) the low-frequency part $l'$ of the received luminance signal to amplitude-modulator MA, for modulating the amplitudes of the successive rectangular pulses generated by multivibrator MV; converter CAD changes said pulse-amplitude-modulation into pulse-duration-modulation; so is obtained, at the output of converter CAD, a periodical wave having the desired periodicity ($f_b$, $f_v$ or $f_r$), and having (in each period) a pulse, the duration of which is a function of the luminance to be reproduced; this periodical wave provides, on oil layer $P_1$ of tube $TC_1$ (Figure 1), successive diffracting gratings having all the same number of lines per millimeter, but different ratios between the width of a line and the distance between 2 successive lines; said gratings produce successive diffraction spectra having different luminous intensities, in accordance with the time variations of the received luminance energy. Therefore, on projection screen EP (Figure 1), colored touches of the same very saturated color, but of different brightness are successively produced.

The two Eidophor projectors $TC_1$ and $TC_2$ of Figure 1 cooperate as follows under the control of the received composite video-signal V restored, at the receiving station, after the video-detector DV. SVS is the synchro-video-separator (amplitude filter), which separates the line synchronizing pulses $t_l$ (controlling the sawtooth wave generator O*h*), the field synchronizing signals $t_t$ (controlling the sawtooth wave generator O*v*), and the video-signal carrying the luminance and chrominance informations and having the spectrum represented on Figure 2*a*, in case of the N.T.S.C. color television system; after amplification by amplifier $A_1$ (band width $B_1$, Figure 2*a*), the video-signal spectrum is divided by electronic frequency filters in the following manner:

Filter $F_2$ (bandwidth $B_2$, Figure 2*a*) separates the part $l''$ of the luminance concerning the principal details of the drawing of the scene being scanned at the distant transmitting station;

Filter $F'_2$ (bandwidth $B'_2$, Figure 2*a*) separates the chrominance (*chr*), (modulated color subcarrier), with negligible components of luminance;

Filter $F_3$ (bandwidth $B_3$, equal to $B'_2$, Figure 2*a*) separates the part $l'$ of the luminance containing the greatest part of the luminance energy.

$A_{sr}$ is an amplifier having a very narrow frequency band (centered on the color subcarrier frequency), and having a gating grid $g_1$ controlled by the received line synchronizing pulses $t_l$; $A_{sr}$ separates (at the beginning of each scanning line) the "color burst *sr*" (color reference signal) made of a few periods of the unmodulated color subcarrier.

O is a local oscillator generating a sine-wave at the color subcarrier frequency; the phase and frequency of said wave are maintained in perfect synchronism with the oscillator generating the color subcarrier at the transmitting station in the following classical manner: the wave produced by O and the received color burst *sr* are simultaneously applied to phase detector *dp*, the output of which (through circuit *ct*, of appropriate time constant) controls the bias of a reactance tube associated with oscillator O, so that any accidental phase-shift between local oscillator O and the unmodulated color subcarrier of the transmitting station is automatically corrected.

The difference of phase between the color burst *sr* (or the so corrected local oscillator O) on one side, and the received chrominance signal (*chr*) obtained at the output of filter $F'_2$ on the other side is, in the N.T.S.C. system, a function of the dominant wave length or hue of the color to be reproduced, in accordance with the circular diagram of Figure 2*b*, on which the following table is based:

| Color to be reproduced | Difference of phase ($\alpha-\beta$) between the chrominance signal (*chr*) and the color burst (*sr*); relative values in degrees | Dominant wave-length $\mu_l$ (hue) of the color to be reproduced, expressed in microns×10⁻³ |
|---|---|---|
| red | 0 | 700. |
| purple | 103−61=42 | complementary to 510. |
| blue | 180−(347−283)=116 | 420. |
| bluish green | 180 | 495. |
| green | 180+42=222 | 510. |
| yellow | 180+116=296 | 575. |

Referring to Figures 1 and 2*c*, phase detector DP receives simultanetously: through amplifier *a*, the wave of local oscillator O, and through amplitude limiter *la*, the chrominance signal (*chr*) coming from filter $F'_2$; these two waves, called respectively $E_2\angle\beta$ and $E_1\angle\alpha$ on Figure 2*c*, are applied (through transformers $tr_2$ and $tr_1$) to the plates of diodes $V_1$, $V_2$, the amplitude $E_2$ being much larger than amplitude $E_1$ because of the action of amplifier *a*, and $E_1$ being practically constant because of the action of amplitude limiter *la*. At the output of phase detector DP (Figures 2*c* and 1), a wave $C_1=2E_1.\cos(\alpha-\beta)$ is obtained: it is the "hue signal" characterizing the hue of the color to be reproduced, and applied to the horizontally deflecting plates H of hue decoding cathode ray tube T*d*.

In case of a purely black (or purely white) part of the scene being scanned at the transmitting station, the color subcarrier is no more modulated at said station and reaches the receiving station with the same phase as the color burst *sr*. Therefore the "hue signal" $[C_1=2E_1.\cos(\alpha-\beta)]$ is zero, and plates H position the electronic image of cathode K of tube T*d* on the solid part (on the left) of decoding electrode ED (Figure 1 and Figure 2*d*). Then signal $C_2$, at the output of tube T*d*, is unable to overcome the bias B of the gating grid $g_2$ of tube *lb*, and no signal $(C_3=A_1.\sin\omega_1t)$ reaches the auxiliary deflecting plates $h_1$ of Eidophor projector $TC_1$; no deformation is produced in rectangle $E_1$ of oil layer $P_1$, and no colored light is thrown by projector $TC_1$ on projection screen EP, on which remains only the black and white drawing of the scene being scanned at the transmitting station.

Referring again to Figure 1, the part *l'* (band $B_3$) of the luminance spectrum is, at the output of filter $F_3$, applied to the control grid of pentode L acting as "luminance weighting device"; after amplitude detector DA, the amplitude of the received chrominance signal *chr* (color subcarrier, amplitude modulated by the degree of saturation of the color at the transmitting station) constitutes the "saturation signal S" proportional to the degree of saturation of the color to be reproduced at the receiving station; said saturation signal S provides (through rheostat *r*, *r'*), to the control grid of pentode L, a bias such that the gain of said pentode varies in inverse proportionality to the degree of saturation of the color to be reproduced on projection screen EP. Consequently the voltage $l'_1$ at the output of pentode L is greater, the smaller S (or said degree of saturation) is.

Electronic mixer (*mxl*) mixes said output voltage $l'_1$ with part *l''* of the luminance spectrum (band $B_2$, Figure 2*a*) carrying the details of the drawing of the scene being scanned at the transmitting station. The "weighted luminance signal" so obtained at the output of mixer (*mxl*) modulates the amplitude of the wave $(A_2.\sin\omega_2t)$ generated by oscillator $O_2$, through amplitude modulator ($md_2$). After filter $F_4$ (which suppresses the carrier and one side-band), the single side-band-amplitude-modulated wave $(A_2.\sin\omega_2t)$ energizes plates $h_2$ of Eidophor projector $TC_2$, which, in the classical manner, provides, after reflection on mirror $M_2$, the desired black and white drawing on screen EP; the right proportions between the white light produced by $TC_2$ and the colored light produced by $TC_1$ are secured by the appropriate adjustment of rheostat *r*, *r'*.

As mask M (Figure 1) associated with projector $TC_1$ cuts off the central white image $I_1$ of source $S_1$, but only ⅔ of the spectra ($s_1$ and $s_1'$) on both sides of said image $I_1$ (see Figure 3*a*), there remains a small amount of white light in the colored touches brought by $TC_1$ onto screen EP; account of this fact is taken when adjusting the rheostat *r*, *r'* which provides the bias of the control grid of pentode L. Said rheostat *r*, *r'* must be adjusted also in such a manner that electric voltage $l'_1$ (at the output of pentode L) be zero when saturation signal S is maximum, because the color to be reproduced then is very saturated.

When a relatively large part of the scene being scanned at the distant transmitting station has a uniformly very saturated color, part *l''* of the luminance spectrum (band $B_2$, Figure 2*a*) still acts (through mixer *mxl*, oscillator $O_2$ and amplitude modulator $md_2$) on plates $h_2$ of projector $TC_2$ (although $l'_1$ is then equal to zero); while the brightness of the colored touch produced by projector $TC_1$ remains constant (if the amplitude $A_1$ of the frequency modulated wave $(C_3=A_1.\sin\omega_1t)$ applied to plates $h_1$ remains constant), part *l''* of the luminance spectrum produces "saturation variations" which give the illusion of "brightness variations" for the small details of said part of said scene.

Figure 1*c* illustrates the case when it is possible to have a large transparent plate PL with an oil layer P inside one single Eidophor projector TC (replacing the tubes $TC_1$ and $TC_2$ of Figure 1): two pencils of electrons scan respectively, in perfect synchronism, the homothetic rectangles $E_1$, $E_2$ on the surface of said oil layer P, plate PL rotating slowly in the direction of arrow *f* within tube TC. R is a small oil container below tube TC, although it is shown, on Figure 1*c*, as a transversal cut brought in the plane of plate PL. The oil is delivered under pressure to plate PL (from container R, through pipes $p_1$, $p_2$ and oil filters $F_1$, $F_2$) by means of "delivering bars $ba_1$, $ba_2$" having slots close to the surface of PL, and lying in a radial direction. As the plate PL rotates, the oil is transported to similarly arranged "smoothing bars $be_1$, $be_2$," whose distance to plate PL is such that the thickness of the oil layer is of the order of 0.1 millimeter in the useful parts, where rectangles $E_1$, $E_2$ are bombarded by electrons.

"Protecting bars $bp_1$, $bp_2$" protect said useful parts against any disturbance due to the liquid delivered in a direction opposite to arrow *f* (which is the direction of rotation of PL).

On the other side of said protecting bars, said liquid delivered in a direction opposite to arrow *f* pushes away the oil already bombarded, and hence partially polymerised by the electron beams. The protective bars ($bp_1$, $bp_2$) are maintained at a low temperature in order to cool said already bombarded oil, which then (together with the newly delivered excess oil) flows into container R, under plate PL.

$P_0$ is a recirculating pump (inside container R); the viscous oil enters the chamber where the slowly moving smooth rotor of $P_0$ transports it along a narrow slit to a barrier (nearly touching the rotor); the oil is so forced under pressure into delivering bars $ba_1$, $ba_2$—and any undesirable disturbance of the oil surface is so avoided.

Figure 1*d* illustrates the operation of delivering bar $ba_1$, smoothing bar $be_1$, protecting bar $bp_1$, and also the evacuation of the already bombarded oil towards container R, under plate PL, which rotates in the direction of arrow *f*; the oil is represented by small dots on said Figure 1*b*. The numerical values quoted in the above description must be considered only as orders of magnitude.

The above description concerns the application of the invention to the American N.T.S.C. color television system; but this invention can be applied, just as well, to any compatible color television system based on any kind of coding of the luminance and the chrominance.

Figure 4A:
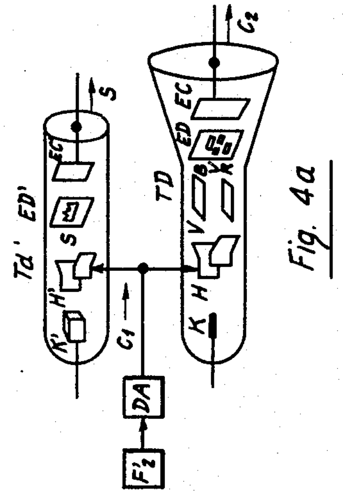

Figure 4 (for example) shows the color triangle divided in sectors corresponding to the various chromaticities that the human eye can easily discriminate from each other; on said triangle (so divided) is based a color television system in which the color subcarrier is modulated only in amplitude by a "chrominance signal," which is a voltage proportional to the number of the sector representing the chromaticity to be reproduced at the receiving station; this "chrominance signal" therefore carries informations concerning both the hue and the degree of saturation of said chromaticity to be reproduced. In this case, the phase detector DP of Figure 1 is not used any more, and the amplitude detector DA (Figure 4*a*) feeds directly the horizontally deflecting plates H, H' of two decoding cathode ray tubes T*d*, T*d'*, decoding respectively the saturation signal S, and the hue signal $C_2$ corresponding to the desired chromaticity.

The saturation decoding cathode ray tube T*d'* contains a vertical rectilinear cathode and a decoding electrode ED′ provided with a slit having one rectilinear edge and one sinuous edge, because signal $C_1$ (produced by amplitude detector DA energized by the received modulated color subcarrier at the output of filter $F'_2$), applied to plates H′, is proportional to the various numbers of the sectors of the triangle of Figure 4, whereas the degrees of saturation (of the chromaticities represented respectively by said sectors) vary alternately from a low value (for a central sector) to a high value (for a peripheric sector) when the increasing order of sector numbers is followed. The hue decoding cathode ray tube T*d* (Figure 4*a*) operates like the same tube T*d* on Figure 1.

Without further analysis, the foregoing will so fully reveal the gist of the present invention that others can, by applying current knowledge, readily adapt it for various applications without omitting features that, from the stand-point of prior art, fairly constitute essential characteristics of the generic or specific aspects of this invention, and, therefore, such adaptations should, and are intended to be comprehended within the meaning and range of equivalence of the following claims.

What is claimed as new and desired to be secured by Letters Patent is:

1. Color television receiving station of the type in which the received luminance signal controls the production (on a projection screen) of a detailed black and white drawing of the scene being scanned at the distant transmitting station, while the received chrominance signal controls the production of a relatively coarse colored picture of said scene superimposed on said black and white drawing, comprising in combination: means for separating from each other said received luminance signal, said received chrominance signal, the color reference signal or "color burst" received at the beginning of each scanning line, the received lines synchronizing pulses, and the received fields synchronizing signals, means for extracting (from said chrominance signal) a so-called "hue signal" characterizing the hue of the color to be reproduced, and a so-called "saturation signal" proportional to the degree of saturation of said color to be reproduced, a luminance weighting device controlled by said received luminance signal and by said saturation signal, for producing a so-called "weighted luminance signal," a first oscillator, an electronic amplitude modulator associated with said first oscillator for producing a wave of constant frequency, whose amplitude is modulated by said weighted luminance signal, a device generating a wave of varying periodicity, a gated amplifier having its control grid energized by said wave of varying periodicity and its gating grid negatively biased, said hue signal being applied to said gating grid for unblocking said amplifier when said hue signal overcomes said negative bias, two cathode ray tubes having each a transparent rotating plate with an oil layer, the face of said plate in contact with the oil being electroconductive and raised to a high positive potential referred to the cathode, two relaxation oscillators respectively controlled by said receiving lines synchronizing pulses and by said received fields synchronizing signals, deflecting coils acting on the electron pencils of said tubes and energized by the saw-tooth waves generated respectively by said relaxation oscillators, whereby two homothetic rectangles of the oil layers of said tubes are scanned, in perfect synchronism, horizontally and vertically with constant velocities, power sources of white light illuminating, at normal incidence, through said rotating transparent plates, said homothetic rectangles of said oil layers, deflecting plates energized by said wave having its amplitude modulated by said weighted luminance signal, for producing a vibration of constant frequency superimposed on said constant velocity horizontal sweeping, whereby deformations are produced on the surface of the oil layer of the first of said cathode ray tubes, two optically conjugated bar systems through which can pass only the white light diffracted by the deformations of said oil layer, a first objective imaging said deformations of said oil layer onto said projection screen, for producing said detailed black and white drawing of the scene scanned at the distant transmitting station, deflecting plates energized by said wave of varying periodicity, for producing a vibration of variable periodicity superimposed on said constant velocity horizontal sweeping, whereby deformations are produced on the surface of the oil layer of the second of said cathode ray tubes, a mask made of opaque parts separated by transparent parts through which can pass only the desired colored light diffracted by the deformations of said oil layer, a second objective imaging said deformations of said oil layer onto said projection screen for adding colored touches to said detailed drawing, whereby said scene, being scanned at the distant transmitting station, is reproduced in colors on said projection screen.

2. Color television receiving station in accordance with claim 1 in which a network of elemental lenses is associated with said mask, said elemental lenses corresponding to the various elemental squares of the rectangle of the oil layer being scanned by said electron pencil which vibrates under the control of said wave of varying periodicity.

3. Color television receiving station in accordance with claim 2, in which said mask is located on the plane containing the focal points of all said elemental lenses.

4. Color television receiving station in accordance with claim 2 comprising: a network of elemental lenses corresponding to the various elemental squares of said rectangle of oil layer scanned by said electron pencil which vibrates under the control of said wave of varying periodicity, a mask made of opaque parts separated by transparent parts, and located immediately below said network of elemental lenses, a bar system for making perfectly parallel the rays of white light illuminating said rectangle of oil layer, and a screen provided with small holes, and located in the plane containing the focal points of said elemental lenses, for suppressing any light except the desired colored lights.

5. Color television receiving station in accordance with claim 1 comprising: a bar system through which pass the white luminous rays illuminating said rectangle of the oil layer scanned by said electron pencil which vibrates under the control of said wave of varying periodicity, and a mask, located on the other side of said oil layer, and having opaque parts exactly above the slits of said bar system, said opaque parts being separated by transparent parts through which pass only the desired colored lights.

6. Color television receiving station in accordance with claim 1 in which said device generating said wave of varying periodicity comprises: an oscillator generating a sine-wave, a frequency modulator of telegraphic type acting on the anti-resonant circuit of said oscillator, and a 3-step voltage generator controlling said frequency modulator and synchronized by said received lines synchronizing pulses.

7. Color television receiving station in accordance with claim 1 in which said device generating said wave of varying periodicity comprises: a first oscillator generating a sine-wave, a frequency modulator of telegraphic type synchronised by the received lines synchronizing pulses and acting upon the anti-resonant circuit of said first oscillator, a second oscillator generating another sine-wave, and an electronic switch, synchronized by the received fields synchronizing signals, for substituting said second oscillator to said first oscillator every two fields.

8. Color television receiving station in accordance with claim 1 in which said device generating said wave of varying periodicity comprises: three oscillators generating three sine-waves of fixed frequencies, three gated amplifiers fed by said oscillators, an electronic switch opening successively the gates of said amplifiers, and a device, synchronized by the received lines synchronizing pulses, generating a 3-step voltage controlling said electronic switch.

9. Color television receiving station in accordance with claim 1 in which said device generating said wave of varying periodicity comprises: three oscillators generating three sine-waves of fixed frequencies, gated amplifiers and electronic mixers associated with said oscillators, and two multivibrators acting on the gating grids of said amplifiers, and respectively synchronized by the received lines synchronizing pulses and the received fields synchronizing signals.

10. Color television receiving station in accordance with claim 1, in which the voltage of varying periodicity, applied to the auxiliary horizontally deflecting plates acting on the electron pencil of the tube producing colored touches on said projection screen, has a saw-tooth waveform, having a period corresponding successively to the numbers of lines (per millimeter) of the elemental diffracting gratings to be produced on the oil layer of said tube.

11. Color television receiving station in accordance with claim 1, in which the voltage of varying periodicity, applied to the auxiliary horizontally deflecting plates acting on the electron pencil of the tube producing colored touches on said projection screen, has a rectangular waveform of appropriate ratio (between the duration of the rectangular pulse and the time interval between two consecutive pulses), and has a fundamental period corresponding successively to the numbers of lines (per millimeter) of the elemental diffracting gratings to be produced on the oil layer of said tube..

12. Color television receiving station in accordance with claim 11, in which the devices acting on the electron pencil of the tube producing colored touches on said projection screen comprise: a multivibrator generating a rectangular wave of a periodicity corresponding to a primary component of the hue of the color to be reproduced, a modulator for modulating the amplitude of the rectangular pulse within the successive periods of said wave, a converter of pulse-amplitude-modulation into pulse-duration-modulation, and a gated amplifier, the control grid of which is energized by the low-frequency part of said received luminance signal, whereas the gating grid is negatively biased by a battery, and is also submitted to the action of said saturation signal proportional to the degree of saturation of said color to be reproduced, the output voltages of said amplifier and of said multivibrator being applied to said amplitude modulator, whereby, at the output of said converter, but only during the reproduction of very saturated colors, is obtained a periodical wave having a periodicity corresponding to said primary component of color to be reproduced, but having, in each period, a pulse of a duration function of the luminance to be reproduced.

13. Color television receiving station in accordance with claim 1, in which a single cathode ray tube with two electron guns replaces the two tubes recited in claim 1, said single tube comprising: a rotating transparent plate with an oil layer, two homothetic rectangles of which are scanned, in perfect synchronism, by the electron pencils issued from said electron guns, an oil container located under said transparent plate, a rotating pump inside said container, two delivering bars fed in oil by said pump, for delivering oil to said transparent plate, two smoothing bars, for giving a small uniform thickness to the useful parts of said oil layer where said homothetic rectangles are located, two protecting bars, for protecting said useful parts against any disturbance due to the oil delivered in a direction opposite to the rotation of said transparent plate, and a device for maintaining said protecting bars at a low temperature, in order to cool the oil already bombarded by said electron pencils.

14. Color television receiving station in accordance with claim 1, in which the devices for focusing the electrons (of the electron pencils of said tubes producing on said projection screen the pictures of the scene being scanned at the transmitting station) upon the oil layers of said tubes, comprise: a solenoid acting as a magnetic lens on said electrons, a cathode ray tube provided with a rectilinear vertical cathode, a Wenhelt cylinder, a slotted electrode, a collecting electrode behind said slotted electrode, and a pair of horizontally deflecting plates, energized by said relaxation oscillator which produces the constant velocity horizontal scanning of said oil layers, and an amplifier, energized by the output voltage of said cathode ray tube, for feeding the winding of said solenoid, said received lines synchronizing pulses being applied to said cathode and to said Wenhelt cylinder of said cathode ray tube.

References Cited in the file of this patent

UNITED STATES PATENTS

| | | |
|---|---|---|
| 2,740,829 | Gretener | Apr. 3, 1956 |
| 2,740,833 | Gretener | Apr. 3, 1956 |